(12) United States Patent
Bingleman et al.

(10) Patent No.: US 10,331,019 B2
(45) Date of Patent: Jun. 25, 2019

(54) SPHERICAL CAMERA

(71) Applicant: Avigilon Corporation, Vancouver OT (CA)

(72) Inventors: Luke William Bingleman, Vancouver (CA); Thomas W. Holbrook, Vancouver (CA); Colin Paul Janssen, San Francisco, CA (US); Eric Little, Vancouver (CA); Sudeep Mohan, Surrey (CA); Nigel Geoffrey Taylor, Maple Ridge (CA)

(73) Assignee: AVIGILON CORPORATION, Vancouver (CA)

( * ) Notice: Subject to any disclaimer, the term of this patent is extended or adjusted under 35 U.S.C. 154(b) by 0 days.

(21) Appl. No.: 16/100,037

(22) Filed: Aug. 9, 2018

(65) Prior Publication Data

US 2018/0356710 A1 Dec. 13, 2018

Related U.S. Application Data

(63) Continuation of application No. PCT/CA2018/050674, filed on Jun. 5, 2018.

(60) Provisional application No. 62/515,460, filed on Jun. 5, 2017, provisional application No. 62/515,438, filed on Jun. 5, 2017.

(51) Int. Cl.
*G03B 17/02* (2006.01)
*H04N 5/225* (2006.01)
*G03B 17/26* (2006.01)
*H04N 7/18* (2006.01)

(52) U.S. Cl.
CPC ........... *G03B 17/26* (2013.01); *H04N 5/2251* (2013.01); *H04N 5/2254* (2013.01); *H04N 5/22521* (2018.08); *H04N 7/183* (2013.01)

(58) Field of Classification Search
CPC ................................ G03B 17/00; H04N 7/183
See application file for complete search history.

(56) References Cited

U.S. PATENT DOCUMENTS

| | | | |
|---|---|---|---|
| 6,357,936 B1 * | 3/2002 | Elberbaum | G03B 37/02 206/316.2 |
| 7,614,804 B2 | 11/2009 | Kim | |
| 9,167,137 B2 | 10/2015 | Neufeld et al. | |
| 9,451,133 B2 | 9/2016 | Stark et al. | |
| 9,536,292 B2 | 1/2017 | Afrooze et al. | |
| 9,615,032 B2 | 4/2017 | Afrooze et al. | |
| 9,674,450 B2 | 6/2017 | Mohan | |

FOREIGN PATENT DOCUMENTS

| | | |
|---|---|---|
| KR | 10-0847088 B1 | 7/2008 |
| WO | 2015-106138 A1 | 7/2015 |

* cited by examiner

*Primary Examiner* — Minh Q Phan
(74) *Attorney, Agent, or Firm* — Daniel Hammond

(57) ABSTRACT

A spherical camera is disclosed. The camera includes an imaging unit. A base of the camera includes a track. A spherical housing includes a first housing part for containing the imaging unit. A second housing part includes a dove tail shaped to be slidably received within the track of the base. A loop is positionable around a periphery surface of the base, the loop being tightenable from a first position wherein the spherical housing is tiltable along the track to a second position wherein the spherical housing is locked in position.

20 Claims, 25 Drawing Sheets

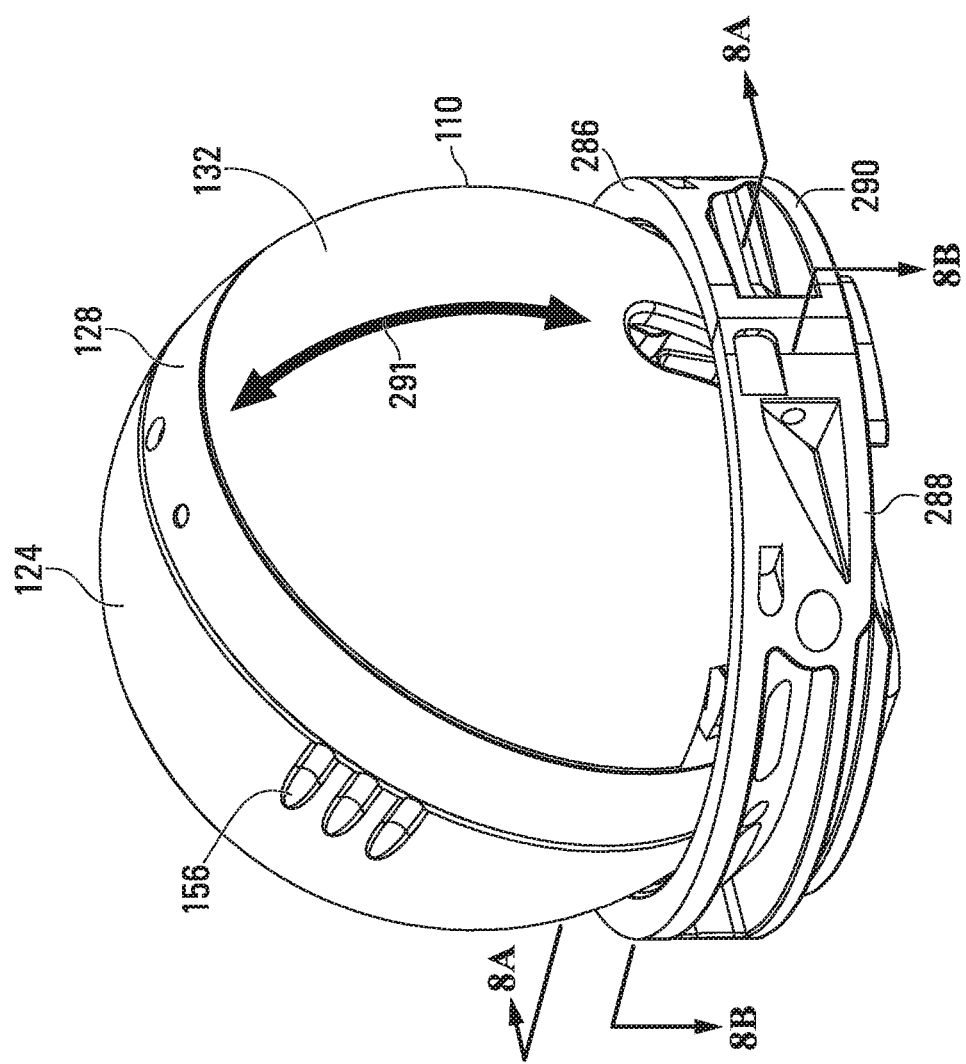

SPHERICAL CAMERA

CROSS REFERENCE TO RELATED APPLICATIONS

This application is a continuation of PCT application Ser. No. PCT/CA2018/050674, filed Jun. 5, 2018, which claims the benefit of: i) U.S. Provisional Patent Application No. 62/515,460 filed Jun. 5, 2017; and ii) U.S. Provisional Patent Application No. 62/515,438 filed Jun. 5, 2017. The contents of the above applications are hereby incorporated by reference in their entireties.

The present application is related to commonly-owned U.S. application Ser. No. 15/996,137, entitled "ELECTRONICS DEVICE THAT DISSIPATES INTERNAL DEVICE HEAT VIA HEAT SINK HAVING EXPOSED SURFACE" filed Jun. 1, 2018.

FIELD

The present subject-matter relates to cameras and, in particular, spherical cameras.

BACKGROUND

Dome cameras are widely used in various applications for capturing images of a scene. The application of surveillance is one particular application. The dome of the camera can protect components of the camera from outside particles and liquids. Furthermore, the dome can assist in concealing the orientation of the lens of the camera. This concealment reduces the feeling of intrusion for people located near the camera. Typically, the imaging unit of a dome camera is pan rotated and tilted to aim the imaging unit in a direction for a desired field of view when it is then locked into place by a screw. It would advantageous for the optical module to be more easily locked into place from rotation.

SUMMARY

According to one example embodiment, there is provided a camera including an imaging unit. A base of the camera includes a track. A spherical housing includes a first housing part for containing the imaging unit. A second housing part includes a dove tail shaped to be slidably received within the track of the base. A loop is positionable around a periphery surface of the base, the loop being tightenable from a first position wherein the spherical housing is tiltable along the track to a second position wherein the spherical housing is locked in position.

According to another example embodiment, there is provided a camera that includes an imaging means. The camera also includes a base that includes a track means. Means for housing camera components includes a first housing part to contain the imaging means. A second housing part includes a dove tail shaped to be slidably received within the track means of the base. The camera also includes means for changing tightness states defined as between the dove tail and the track means. In a first tightness state of the tightness states the spherical housing is tiltable and in a second tightness state of the tightness states the spherical housing is locked in position.

According to another example embodiment, there is provided a security camera is provided, including: a spherical housing, an imaging unit positioned within the spherical housing, the imaging unit having an optical field of view, the imaging unit having a first axis; a first portion of the spherical housing within the field of view of the imaging unit being optically transparent; an infrared (IR) emitter positioned within the spherical housing at a second axis off axis to the first axis, the IR emitter having a IR field of view; a second portion of the spherical housing within the IR field of view being IR transparent; and wherein an opaque barrier separates the first portion of the spherical housing and the imaging unit from the second portion of the spherical housing and the IR emitter.

According to another example embodiment, there is provided a lenslet positionable in a sphere containing a camera is provided, including: a curved surface alignable with a surface of the sphere; an infrared (IR) illuminator; an inner surface to receive IR emissions from the IR emitter; wherein IR emissions from the IR illuminator are directable through the inner surface and the curved surface towards a field of view of an optically clear window on the sphere. The inner surface may at least partially extend outwardly towards the optically clear window and a surface of the sphere. The lenslet may further include an elongated recess separating the inner surface from the IR emitter.

According to another example embodiment, there is provided a method of directing IR emissions from an IR emitter within a sphere towards a field of view of an imaging unit within the sphere, including: providing a lenslet including: a curved outer surface aligned with the sphere; an inner surface; and the IR emitter; positioning the lenslet off axis to the imaging unit; and directing the IR emissions through the inner surface and the outer surface towards the field of view.

BRIEF DESCRIPTION OF THE DRAWINGS

Reference will now be made, by way of example, to the accompanying drawings:

FIG. 7A illustrates a side perspective view of a dome camera in accordance with at least one example embodiment, showing the spherical housing and pan base, and tilt axis;

Similar or the same reference numerals may have been used in different figures to denote similar example features illustrated in the drawings.

DETAILED DESCRIPTION OF EXAMPLE EMBODIMENTS

Figure 1:
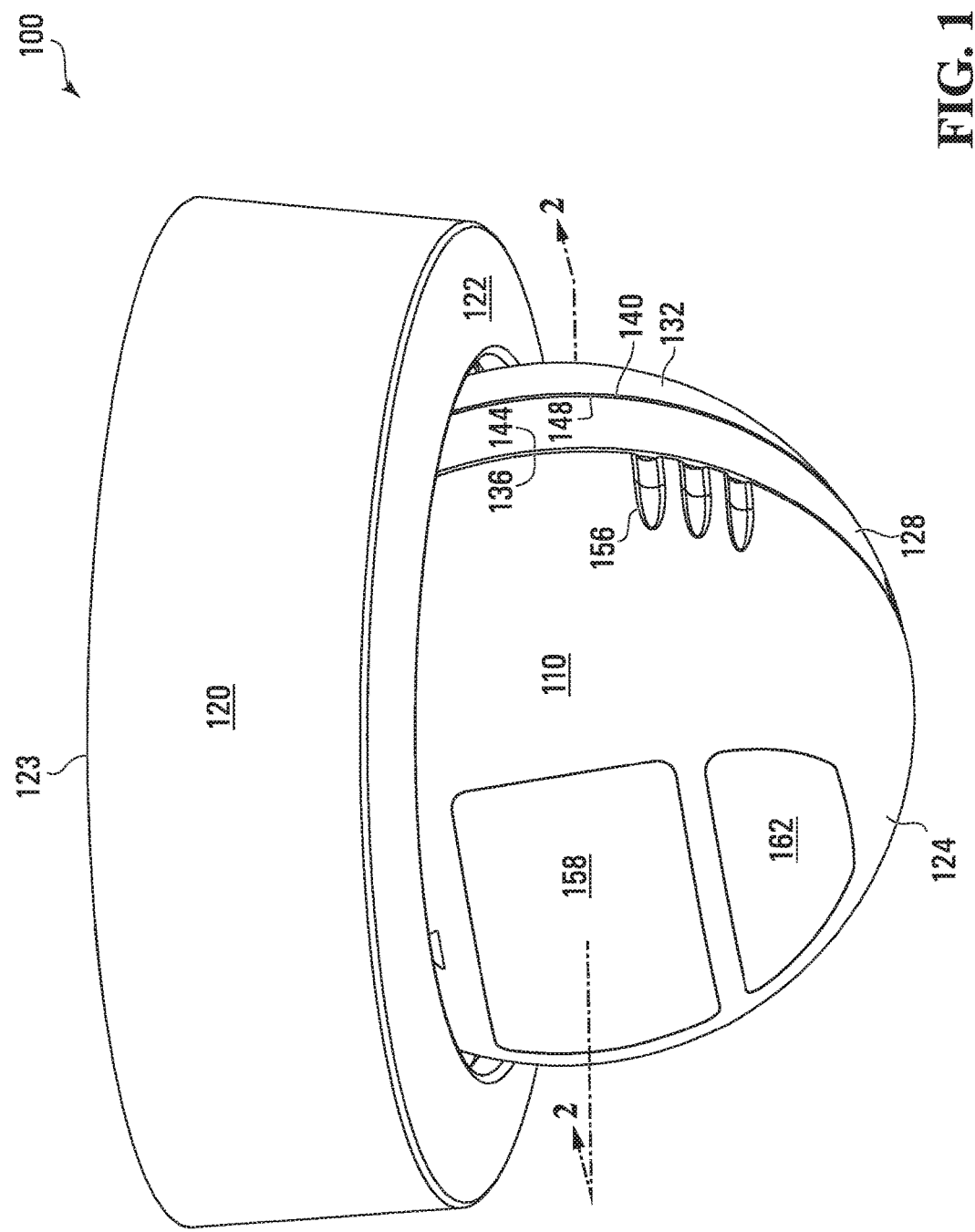
FIG. 1 illustrates a perspective view of a dome camera device in accordance with at least one example embodiment, the dome camera including a movable spherical housing/part and a stationary bezel part.

A detailed description of one or more embodiments is provided below along with accompanying figures that illustrate the principles thereof. The scope is limited only by the claims and encompass numerous alternatives, modifications and equivalents. Numerous specific details are set forth in the following description in order to provide a thorough understanding. These details are provided for the purpose of example and the systems and methods described herein may be practiced according to the claims without some or all of these specific details. For the purpose of clarity, technical material that is known in the technical fields related to the invention has not been described in detail so that the invention is not unnecessarily obscured.

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. It will be understood that when an element is herein referred to as being "connected", "in communication with" or "coupled" to another element, it can be directly connected, directly in communication with, or directly coupled to the other element, or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments", unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed aspect(s)

are widely applicable to numerous embodiments, as is readily apparent from the disclosure. One of ordinary skill in the art will recognize that the disclosed aspect(s) may be practiced with various modifications and alterations, such as structural and logical modifications. Although particular features of the disclosed aspect(s) may be described with reference to one or more particular embodiments and/or drawings, it should be understood that such features are not limited to usage in the one or more particular embodiments or drawings with reference to which they are described, unless expressly specified otherwise.

No embodiment of method steps or system elements described in the present application is essential or is coextensive, except where it is either expressly stated to be so in this specification or expressly recited in a claim.

FIG. 1 illustrates a perspective view of a dome camera 100 in accordance with at least one example embodiment. The dome camera 100 includes a spherical housing 110, which is moveable, and a bezel 120. A portion of spherical housing 110 is sized to fit within bezel 120. Flat surface 122 of bezel 120 covers the interior of bezel 120. The spherical housing 110 includes an image assembly housing 124, a heat sink 128 and a tiltable cover 132. The exterior surface of the image assembly housing 124 ends at a peripheral edge 136. Similarly, the exterior surface of the tiltable cover 132 ends at a peripheral edge 140. In accordance with at least some examples, the image assembly housing 124, the tiltable cover 132 and the bezel 120 may all be made of a combination of polycarbonate (PC) and acrylonitrile-butadiene-styrene (ABS).

Upper circular edge 123 of the bezel portion 120 is configured to be installed flush against a flat surface such as, for example, a ceiling tile. The dome camera may be mounted on a surface, for example, the dome camera 100 may be installed on a ceiling with the spherical housing 110 pointing to the ground. The dome camera 100 may also be installed on a pendant with the spherical housing 110 again pointing to the ground. The dome camera 100 may also be installed on a wall with the spherical housing 110 pointing parallel to the ground.

The spherical housing 110 tilts approximately from zero to 90 degrees and pan rotates more than 360 degrees in order to ensure that the dome camera 100 may be set to a desired field of view.

Heat sink 128 may, in accordance with some examples, be made wholly or in part from aluminum. The heat sink 128 has an air exposed surface that is interposed between the peripheral edges 136 and 140. An impact of the heat sink 128 having the air exposed surface instead of the heat sink being entirely contained internally within the spherical housing 110 is that heat transmitted through the heat sink is able to be radiated out to the ambient air. In accordance with some examples the air exposed surface of the heat sink 128 is a finished surface, wherein the finish is electrocoating (e-coating) or a powder coating which may positively impact radiative heat transfer (i.e. increase such heat transfer). By providing the heat sink 128, this allows a greater amount of permitted heat to be generated within the spherical housing 110 of the dome camera 100. In this manner, heat generating components normally found outside of the spherical housing 110 (for example, within a camera tail assembly) can be brought within the spherical housing 110. For instance, regarding the example in which the camera device is attached to a camera tail assembly (not shown) this may result in a reduced size of the camera tail assembly or even the elimination of the camera tail assembly. In accordance with at least some examples, the heat sink 128 facilitates maintenance of an ambient temperature of not more than 50° C. for the internal components of the spherical housing 110 when the camera is operated; and has a touch temperature of below 70° C. for its externally exposed surface.

Surface edge 144 of the air exposed surface of the heat sink 128 abuts the peripheral edge 136 of the image assembly housing 124. Similarly, surface edge 148 of the air exposed surface of the heat sink 128 abuts the peripheral edge 140 of the tiltable cover 132. As shown in FIG. 1, the surface edges 144 and 148 are matched in shape and dimension with the peripheral edges 136 and 140 respectively so that an overall composite surface formed by the air exposed surface of the heat sink 128 and the surfaces of the first and second complementary image assembly housing 124 and tiltable cover 132 is substantially continuous and uniform.

The spherical housing 110 includes a curved optically clear window 158 and an IR transparent lenslet 162 as described in detail below. Grooves 156 are positioned parallel to the direction of rotation of spherical housing 110 and provide a grip for manual rotation of image assembly housing 124.

Figure 2:
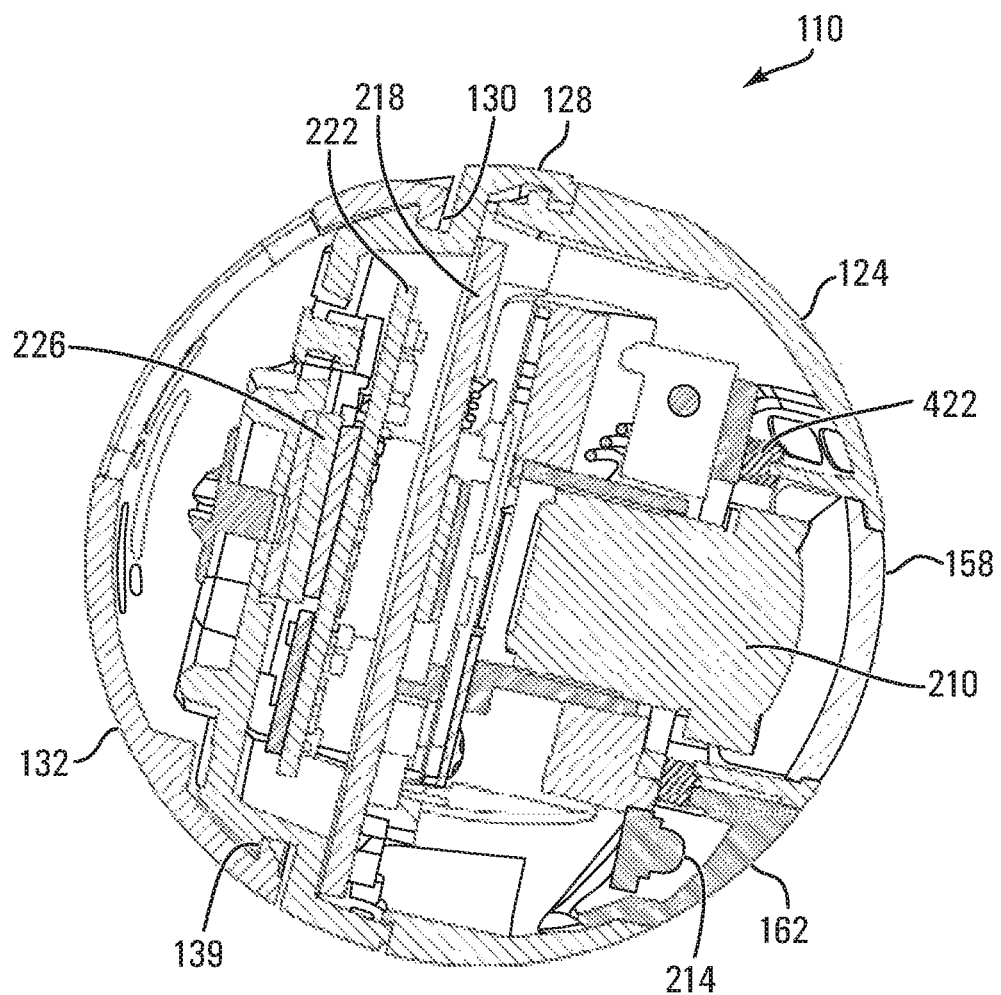
FIG. 2 illustrates a cross-sectional view, taken along line 2-2, of the spherical part of the dome camera shown in FIG. 1.

FIG. 2 illustrates a cross-sectional view of the spherical housing 110 of the dome camera 100 shown in FIG. 1. As shown, multiple components are housed within the spherical housing 110 including an imaging unit 210, IR emitter 214, a sensor printed circuit board assembly (PCBA) 218, a digital PCBA 222, and a gap pad 226 positioned between the digital PCBA 222 and the heat sink 128. Although not shown for convenience of illustration, communication of signals between the lens and imaging unit 210, the sensor PCBA 218 and the digital PCBA 222 is afforded by connecting wiring.

Still with reference to FIG. 2, the illustrated heat sink 128 defines a groove 130 that extends full circle around the heat sink 128. The groove 130 is sized and shaped to align with an extension 139 of the tiltable cover 132 to allow tiltable cover to snap and clip to heat sink 128. This arrangement keeps the tiltable cover 132 secured to heat sink 128 while allowing rotation of heat sink 128 and the image assembly housing 124 relative to the tiltable cover 132.

Imaging unit 210 includes a lens unit, an image sensor, and the associated circuitry (not shown). The lens unit is located at a front end of spherical housing 110. The imaging unit 210 captures images and video of a scene in the field of view of the dome camera 100. The spherical housing 110 has the transparent window 158 which allows light external to the dome camera 100 to pass into the spherical housing 110 which is then captured by the imaging unit 210 to form images and video. The image sensor may any type understood by one skilled in the art to be suitable such as, for example, CMOS, NMOS or CCD.

PCBAs 218 and 222 may further include data manager(s) for storing the captured images and video locally and for transmitting the same over a network to other devices as part of the security system. The PCBAs 218 and 222 may further include communication and control unit(s) for the security system to control the imaging unit 210 as is known in the field.

The dome camera 100 further has wiring (not shown) to connect the imaging unit 210 to PCBAs 218 and 222 where images, including video, captured by the imaging unit 210 are processed before being sent onwards to a security system (not shown) either through more wiring (not shown) or wirelessly (not shown). The processing may include formatting the outputted image data to various image standards such as H.264 or H.265 and further may include analyzing the images using video analytics to detect objects and to classify the objects. The processing may further include compressing, encoding, and decoding the captured images and video.

Figure 3:
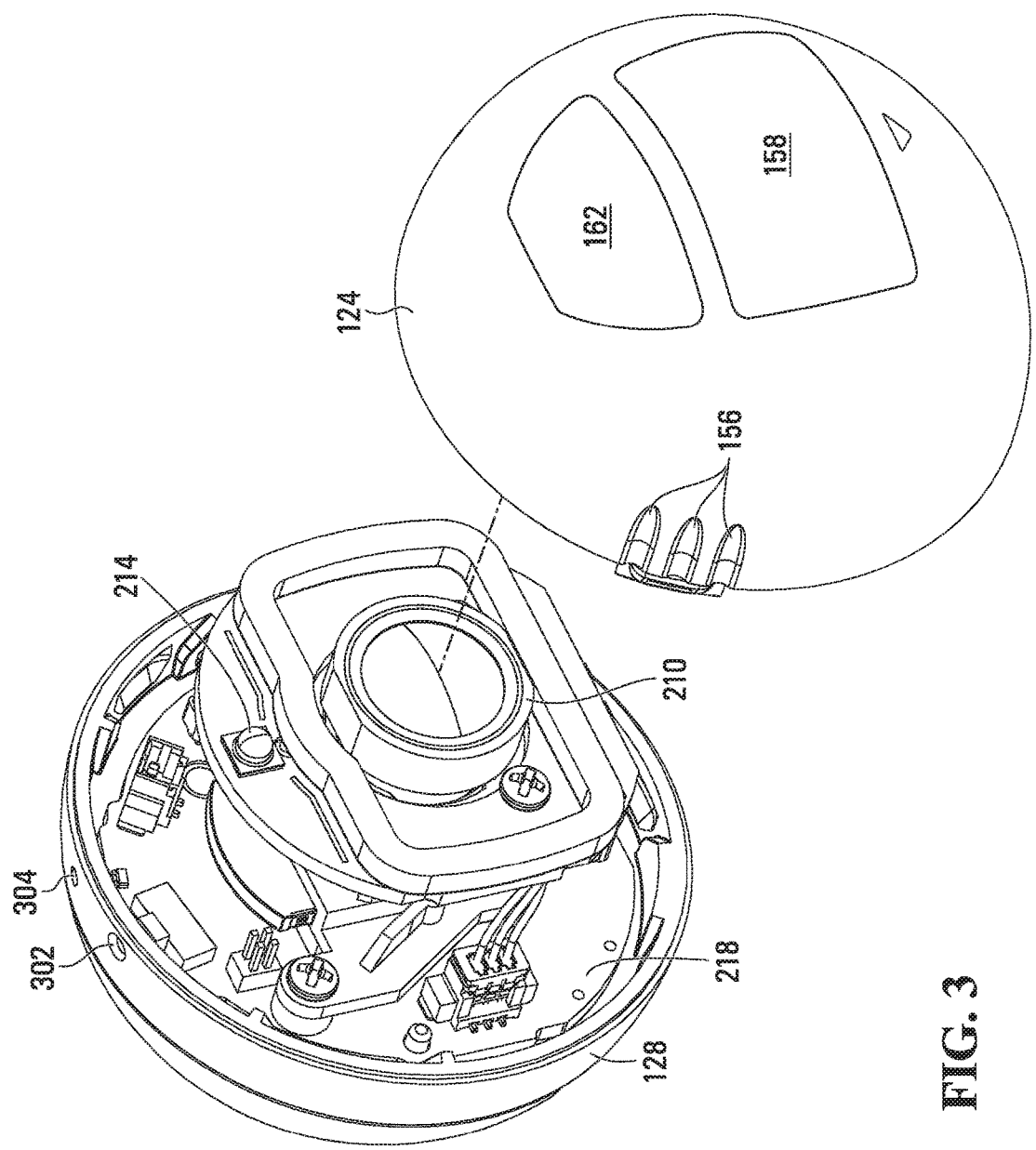
FIG. 3 illustrates a perspective view of the spherical part shown in FIG. 2, shown as partly disassembled to reveal internal components.

FIG. 3 illustrates a perspective view of the spherical housing 110 with the image assembly housing 124 shown as partly disassembled to reveal internal components of the spherical housing 110. Reset switch 302 allows a user to reset camera 100. LED status indicator 304 can indicate the power or operational status of camera 100.

Figure 4:
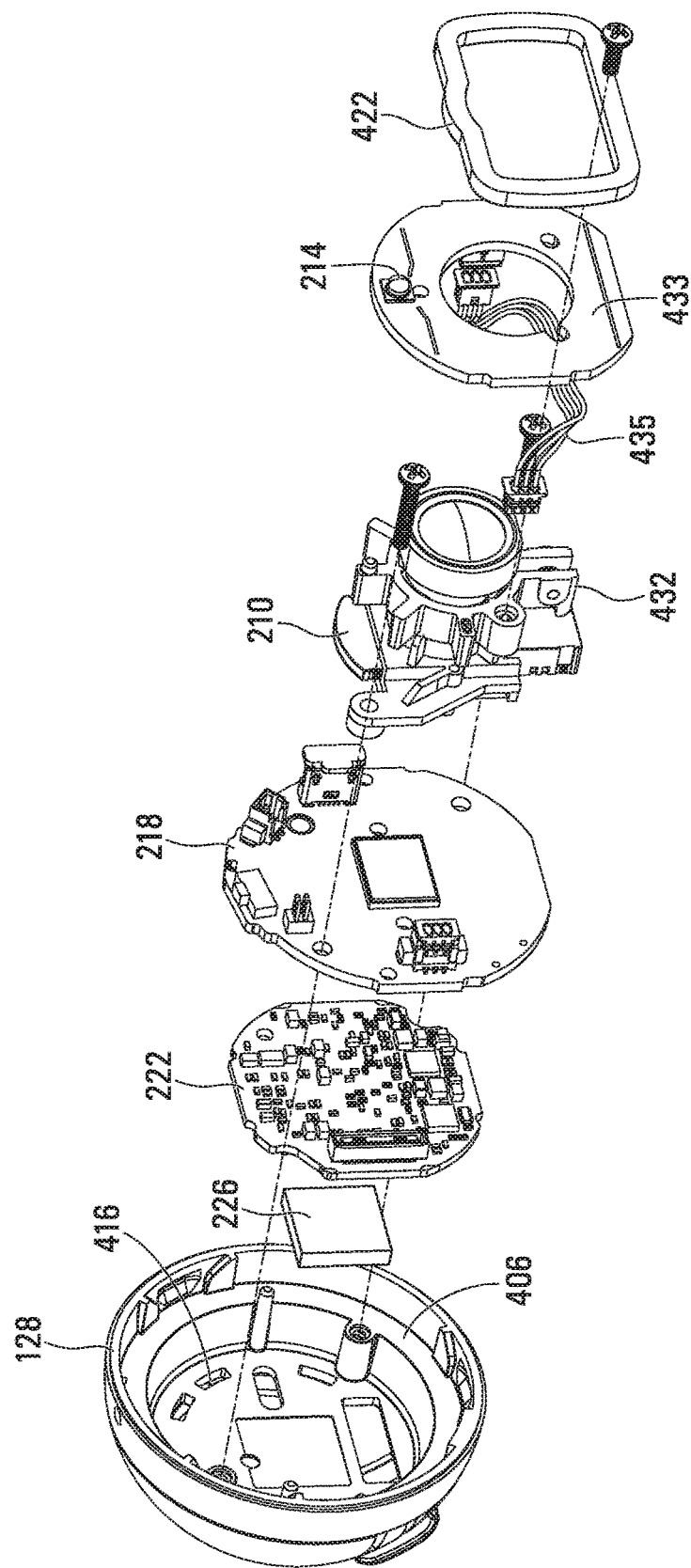
FIG. 4 illustrates an exploded view of the internal components shown in FIG. 3.

FIG. 4 illustrates an exploded view of the internal components of the spherical housing 110. As previously herein described, included within the spherical housing 110 are a number of PCBAs, including the sensor PCBA 218 and the digital PCBA 222. The sensor PCBA 218 includes exposed copper in the form of contacts on the underside of the board. This exposed copper is brought into contact with inner ring 406 of the heat sink 128 during assembly of the spherical housing 110 thereby providing a path via the copper for transmitting heat from the sensor PCBA 218 to the heat sink 128. In contrast to the sensor PCBA 218, the digital PCBA 222 is thermally connected to the heat sink 128 via the gap pad 226. In at least one example, the gap pad 226 is attached directly to the semiconductor chip of the digital PCBA 222 that generates the most heat which may be a System-on-Chip (SoC), for example.

A plurality of slotted holes 416 are defined within a rear wall of the heat sink 128. The holes 416 may facilitate lowering temperatures within the regions of the heat-generating internal components by allowing hot air a path to escape into the rear region of the spherical housing 110. The holes 416 will be covered by the tiltable cover 132 when the spherical housing 110 is fully assembled.

A clamp 432 is used to hold the focus position of the lens in imaging unit 210 in place, and to hold IR PCBA 433 in place (in an embodiment with the aid of a fastener, such as a screw). The imaging unit 210 is held in place by fasteners such as, for example, screws. A gasket 422 is positioned to abut the inner side of the spherical housing 110 and thereby provide an opaque barrier to separate the IR emitter 214 from the imaging unit 210. The IR PCBA 433 holds the IR emitter 214. Signal cable 435 couples the IR PCBA 433 to the sensor PCBA 218.

Figure 5:
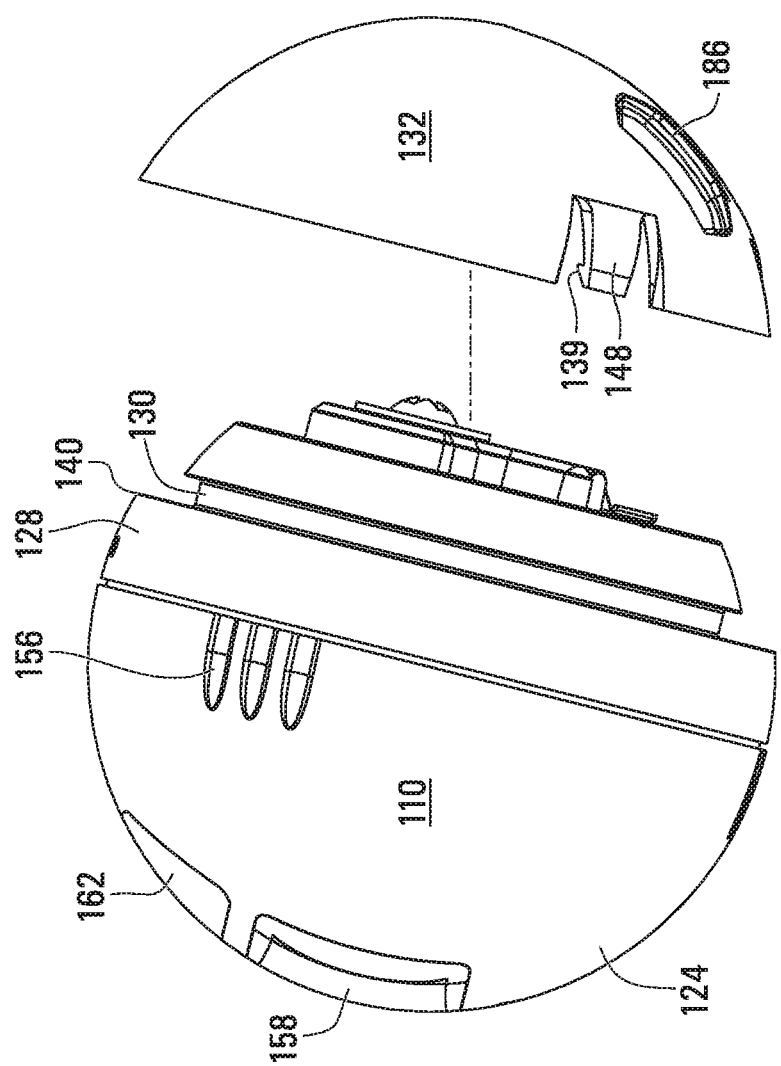
FIG. 5 illustrates a side view of the spherical housing shown in FIG. 2, showing the tiltable cover part separated from the second housing part.

FIG. 5 illustrates a view of spherical housing 110 showing tiltable cover 132 separated from heat sink 128 and image assembly housing 124. Groove 130 is shown circumferentially inlaid within heat sink 128 and extension 139 is shown on arm 148 on tiltable cover 132. Tiltable cover 132 may include two, three, four or more arms 148 or, alternatively, extension 139 may be incorporated into the inner surface of tiltable cover 132.

Figure 6:
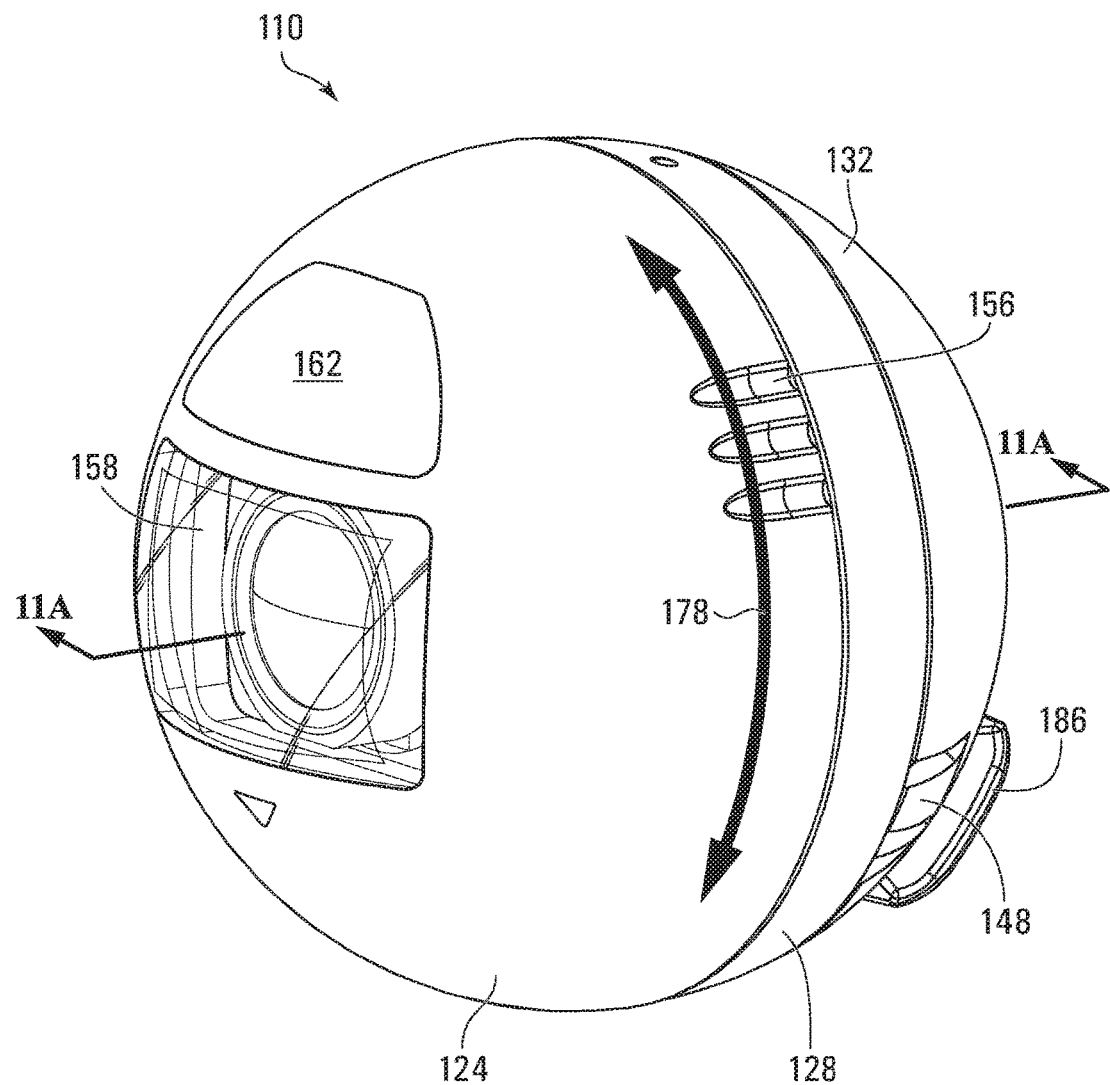
FIG. 6 illustrates a front perspective view of the spherical housing shown in FIG. 5, showing the axis of rotation along the azimuth of the image assembly housing.

FIG. 6 illustrates a view of spherical housing 110 assembled and the axis of rotation 178 of the heat sink 128 and the image assembly housing 124 along the azimuth relative to the tiltable cover 132.

Figure 7B:
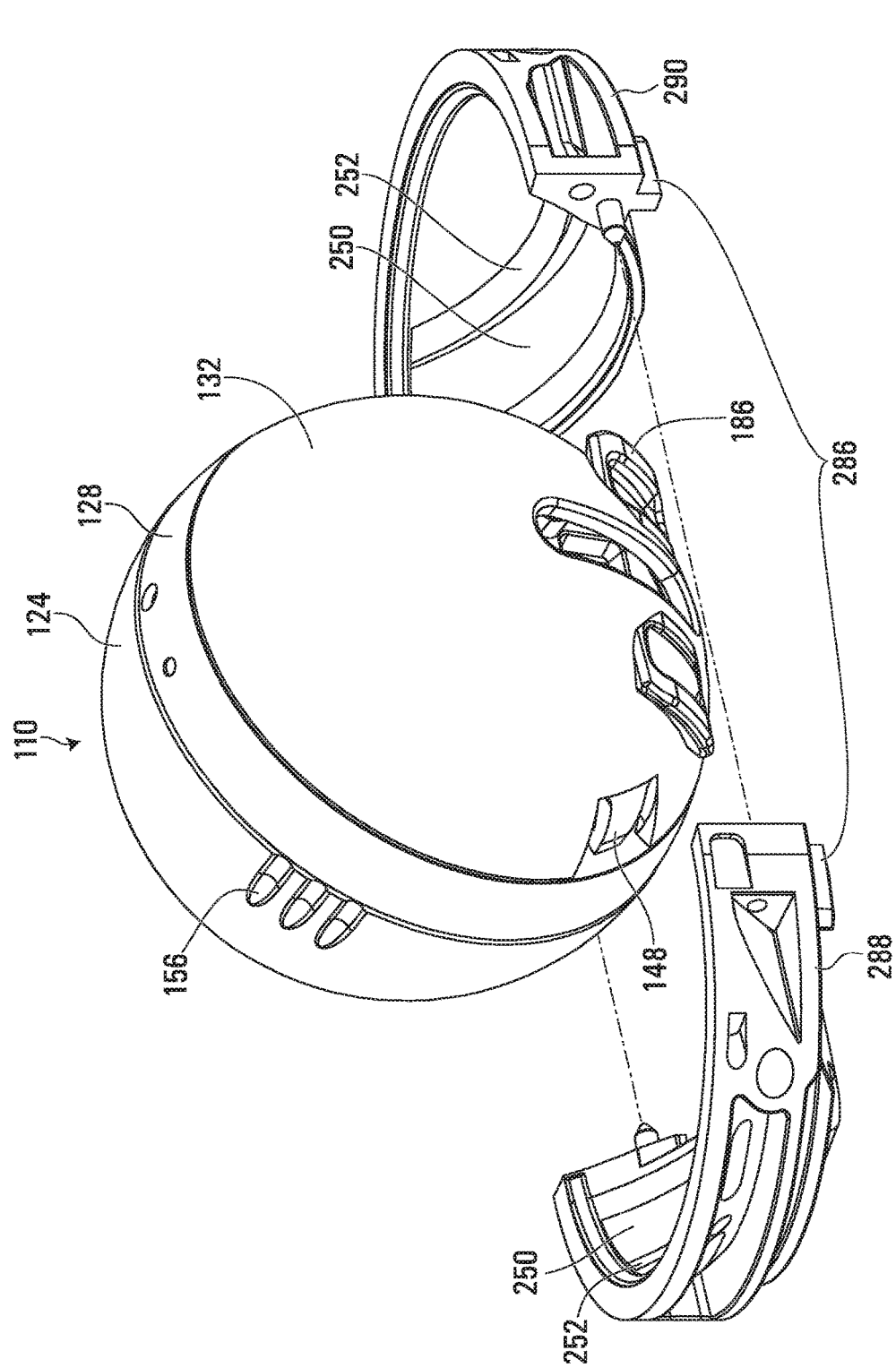
FIG. 7B illustrates a side perspective view of the dome camera shown in FIG. 7A, showing the pan base partly disassembled.

Reference will now be made to FIGS. 7A and 7B. FIG. 7A illustrates a view of the spherical housing 110 in a pan base 286. FIG. 7B illustrates an exploded view of the spherical housing 110 and the pan base 286. The pan base 286 includes a first part 288 and a second part 290, which when abutted, form track 250. Track 250 is sized to slidably receive and hold one or more extensions (such as, for example, dove tail 186) on the tiltable cover 132, and thereby hold the dove tail 186 in place using ledges 252. This arrangement allows the spherical housing 110 to tilt by the dove tail 186 moving along the track 250 as shown by arrow 291.

Figure 8A:
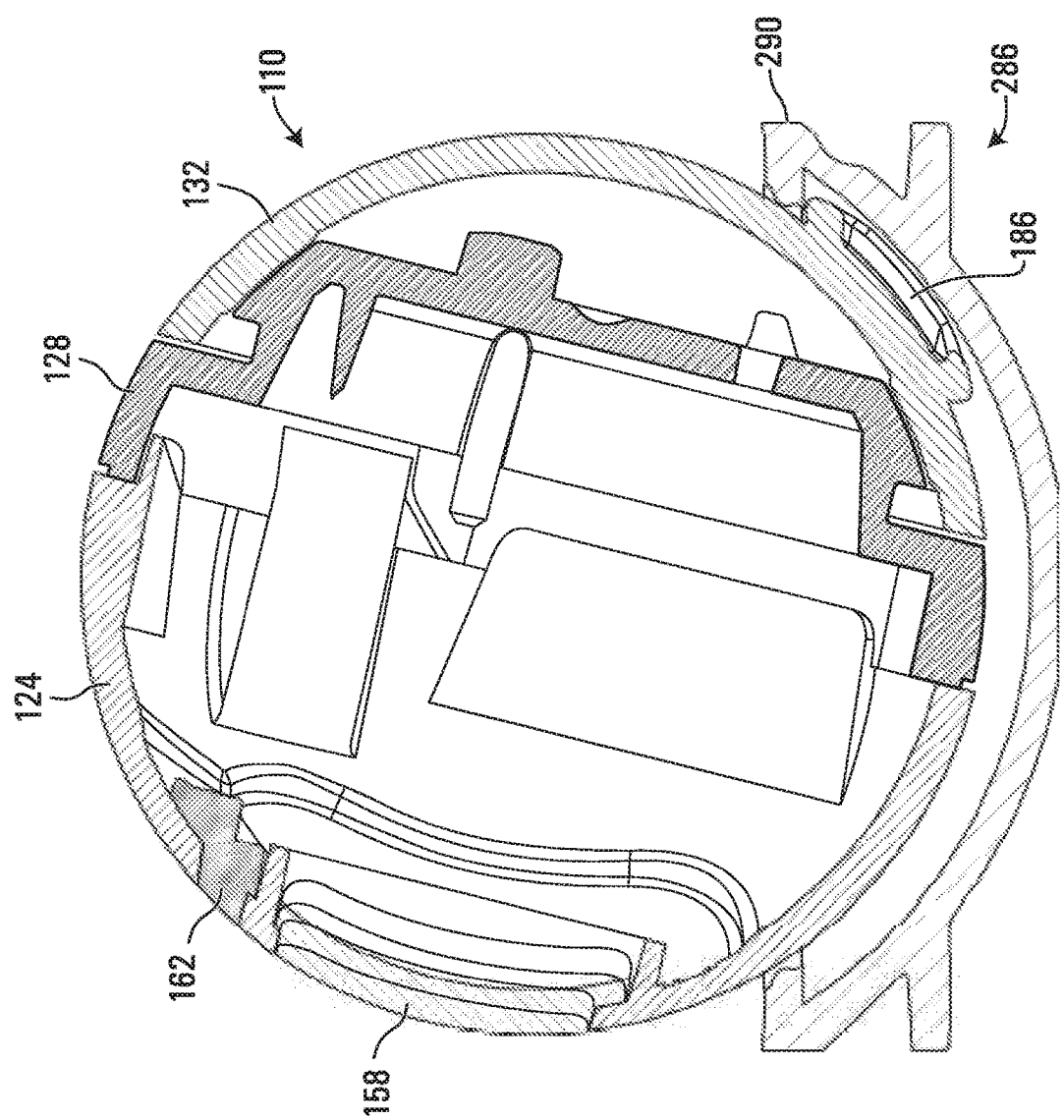
FIG. 8A illustrates a cross sectional rear view of the dome camera shown in FIG. 7A, showing details of the dove tail and pan base.
Figure 8B:
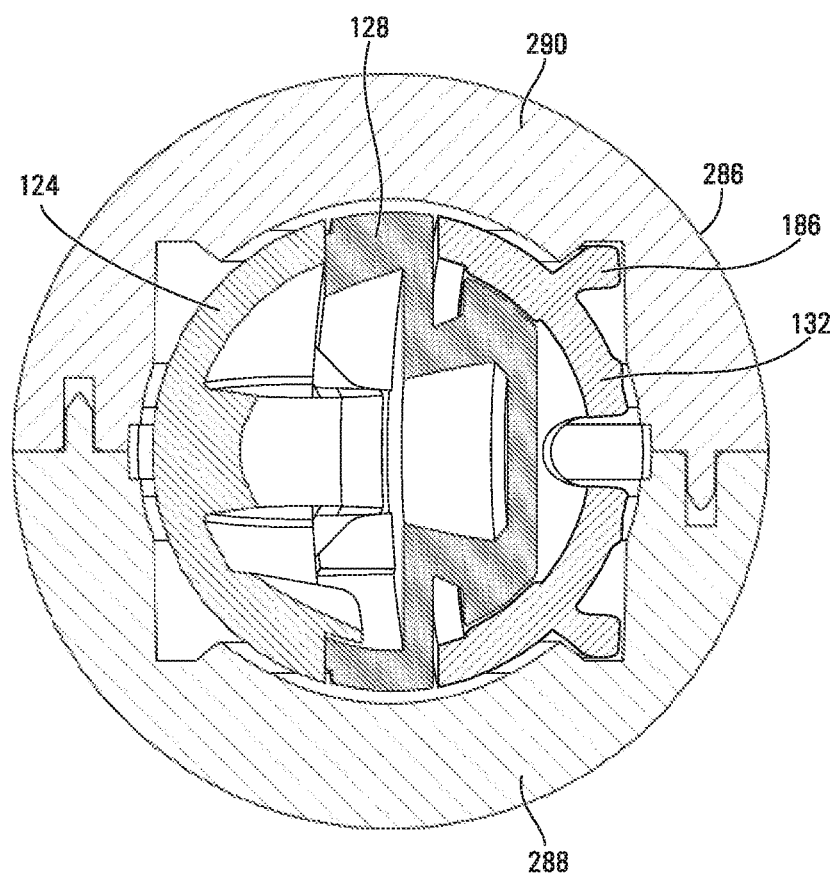
FIG. 8B illustrates an alternative cross sectional rear view of the dome camera shown in FIG. 7A, showing details of the dove tail and pan base.

FIGS. 8A and 8B illustrate cross-sectional views of the spherical housing 110 within the pan base 286, and show how the dove tail 186 fits within the track 250 of the pan base 286.

Figure 9:
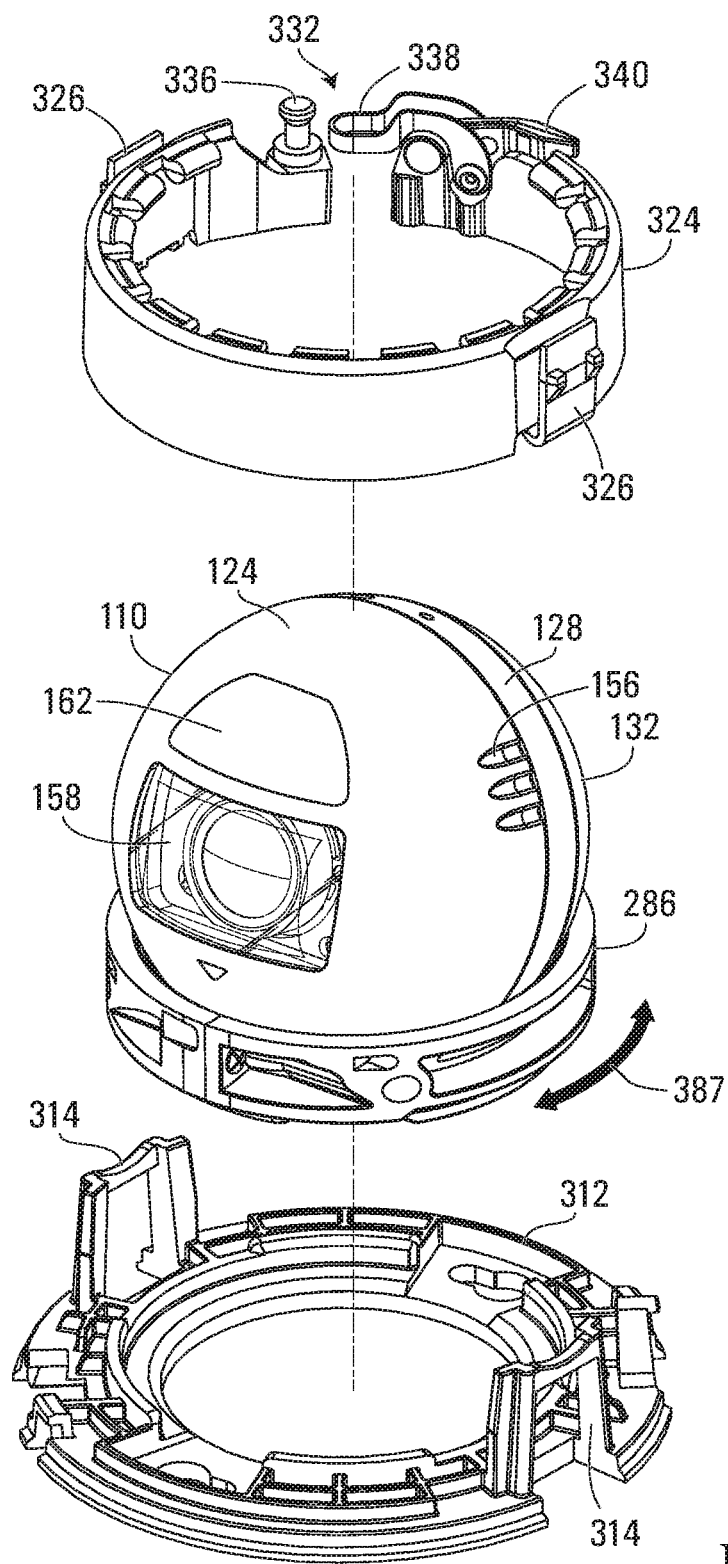
FIG. 9 illustrates an exploded view a dome camera in accordance with at least one example embodiment, showing the spherical housing, clamp ring, and mounting plate, and pan rotation axis.

FIG. 9 illustrates, in accordance with some examples, an exploded view of components of the camera 100. The spherical housing 110 is positioned within the pan base 286. The pan base 286 is positionable within wall plate 312. The wall plate 312 is configured to allow attachment to a wall, ceiling or other surface.

Clamp ring 324 is positionable over the pan base 286. The wall plate 312 may include arms 314 shaped to snap fit with extensions 326, and thereby hold the pan base 286, the clamp ring 324, and the spherical housing 110 in place, although other means of securing the wall plate 312 to the clamp ring 324 may be used. The clamp ring 324 includes latch assembly 332, which includes pin 336, lever 340 and draw latch 338 which can be used to tighten the clamp ring 324. The pan base 286 is rotatably positionable within the wall plate 312 to allow the pan base 286, and the spherical housing 110 therein, to rotate in a panning motion as shown by arrow 387.

Figure 10:
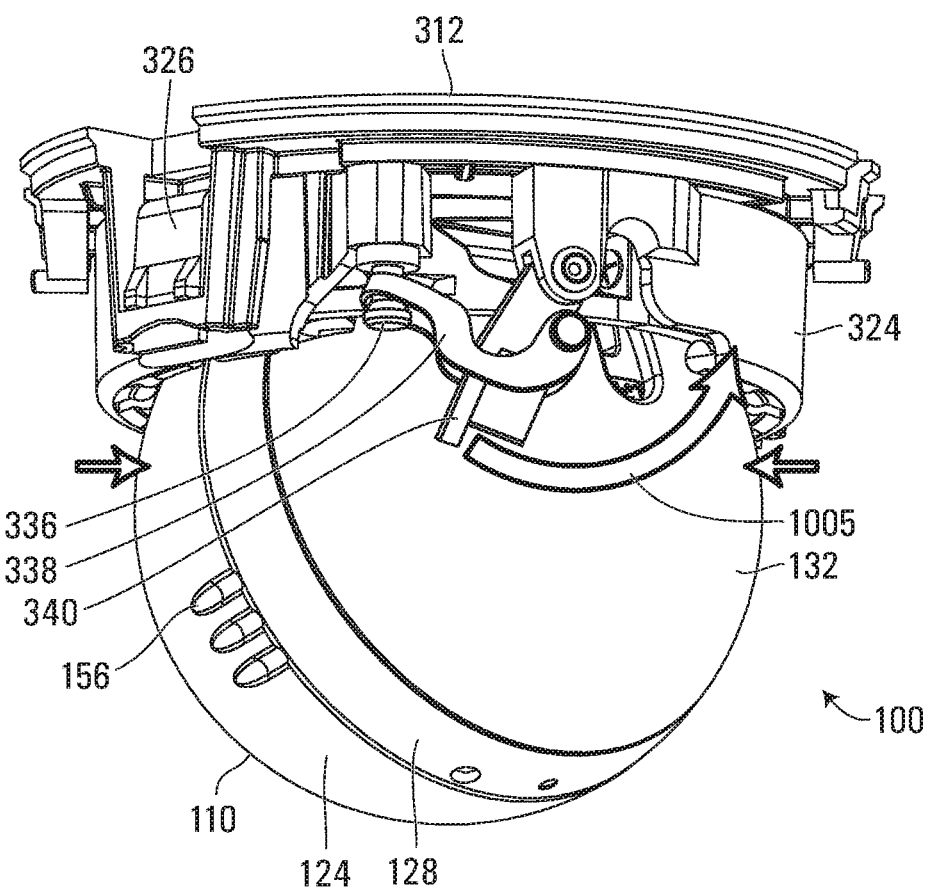
FIG. 10 illustrates a perspective view of a dome camera in accordance with at least one example embodiment, showing the clamp ring.

FIG. 10 illustrates, in accordance with some examples, the dome camera 100, with the spherical housing 110 in position partially within the clamp ring 324. The clamp ring 324 wraps around the pan base 286. The clamp ring 324 is tightened by the latch assembly 332 which can be actuated without the use of tools. When the clamp ring 324 is tightened by moving the lever 340 in direction 1005, the draw latch 338 is held by the pin 336 and thus the diameter of the clamp ring 324 contracts inwardly, squeezing the sides of the spherical housing 110. When the lever 340 is in this closed position, the friction between the clamp ring 324 and the spherical housing 110, prevents the spherical housing 110 from moving in any direction. The spherical housing 110 can tilt and rotate when the lever 340 is in an open position for ease of aiming the camera 100.

Figure 11A:
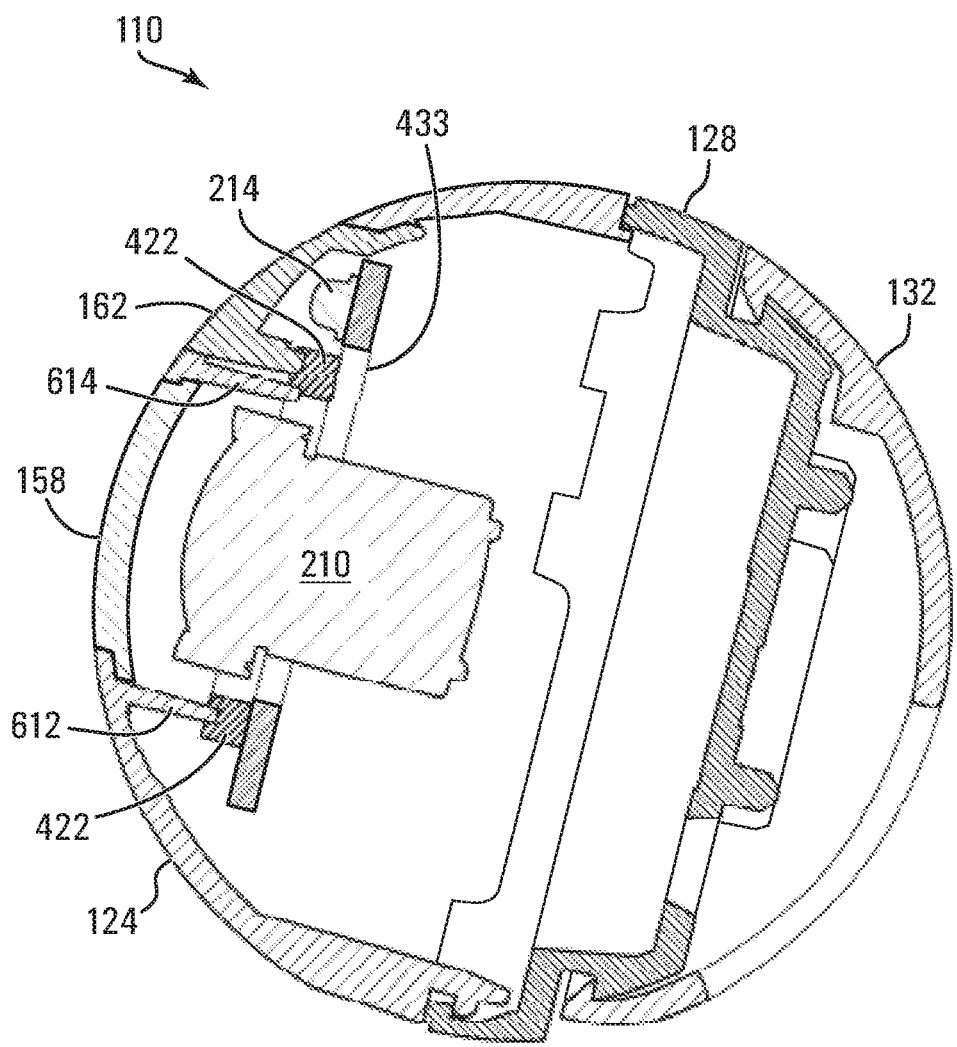
FIG. 11A illustrates a cross sectional view of a dome camera in accordance with at least one example embodiment, showing the barrier separating the IR emitter and the optical unit.

FIG. 11A illustrates a cross sectional view of the spherical housing 110 showing how the IR emitter 214 is optically separated from the imaging unit 210. Imaging assembly housing 124 includes a segmented spherical housing to prevent internal IR reflections (also known as "IR haze") that occurs in conventional IR bubble cameras. The image assembly housing 124 has the clear window 158 through which the imaging unit 210 receives light; and the curved IR transparent lenslet 162 to shape and redirect the IR emission distribution from IR emitter 214 to match the Field Of View (FOV) of the imaging unit 210. Opaque barriers 612, 614 abut gasket 422 and are made of an opaque material that blocks light in the infrared spectrum (referred to herein as "IR emissions" or "IR light"). This blocking prevents IR haze and reflections. The IR lenslet 162 is made of a black material that allows IR emissions to pass thereby blending into the appearance of the spherical housing 110. The use of a smooth spherical surface incorporating the IR lenslet 162 and the clear window 158 makes it more difficult for observers to determine the direction the imaging unit 210 is facing and allows for a smaller architecture of the dome camera 100.

Figure 11B:
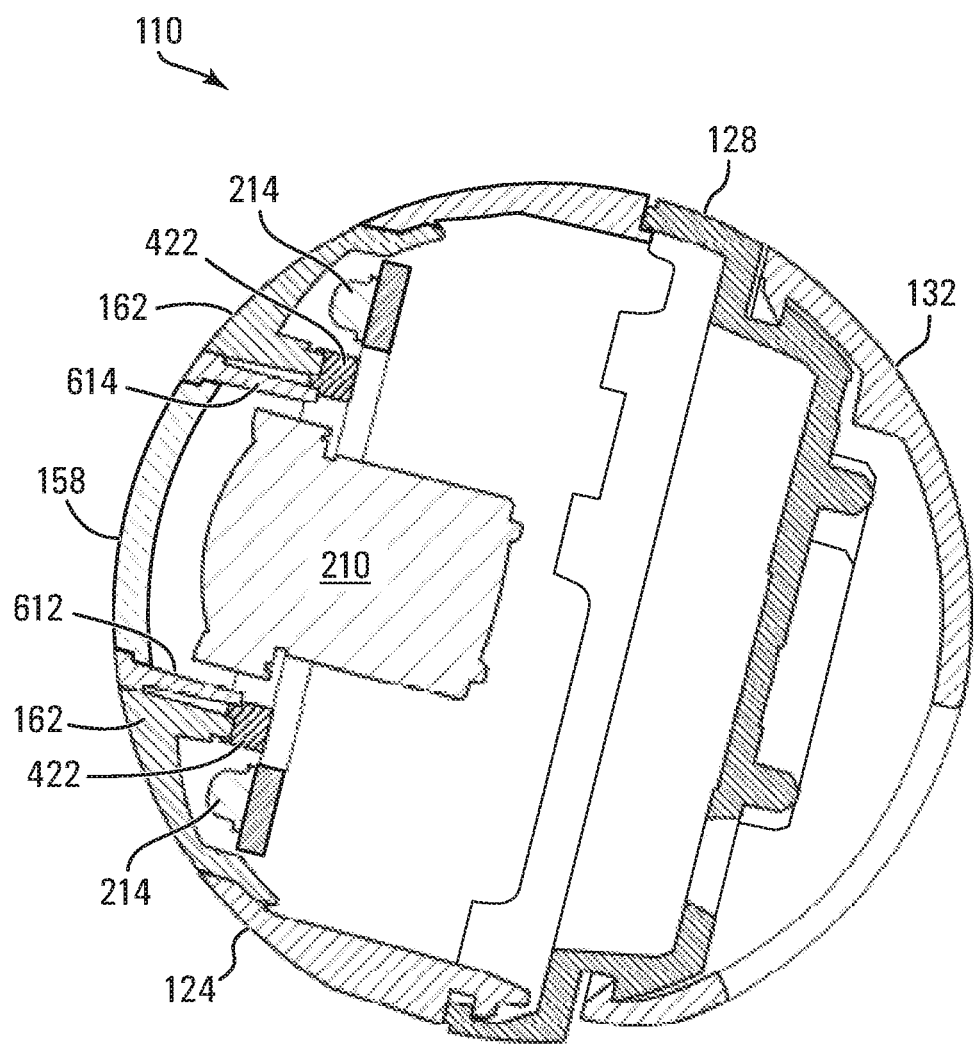
FIG. 11B illustrates a cross sectional view of a dome camera in accordance with another example embodiment, showing two IR emitters.

FIG. 11B illustrates, in accordance with other examples, an embodiment of the spherical housing 110 in which two or more IR emitters 214 are present. In this embodiment each IR emitter is separated from the imaging unit 210 by opaque barriers 612, 614 abutting the gasket 422.

Figure 12:
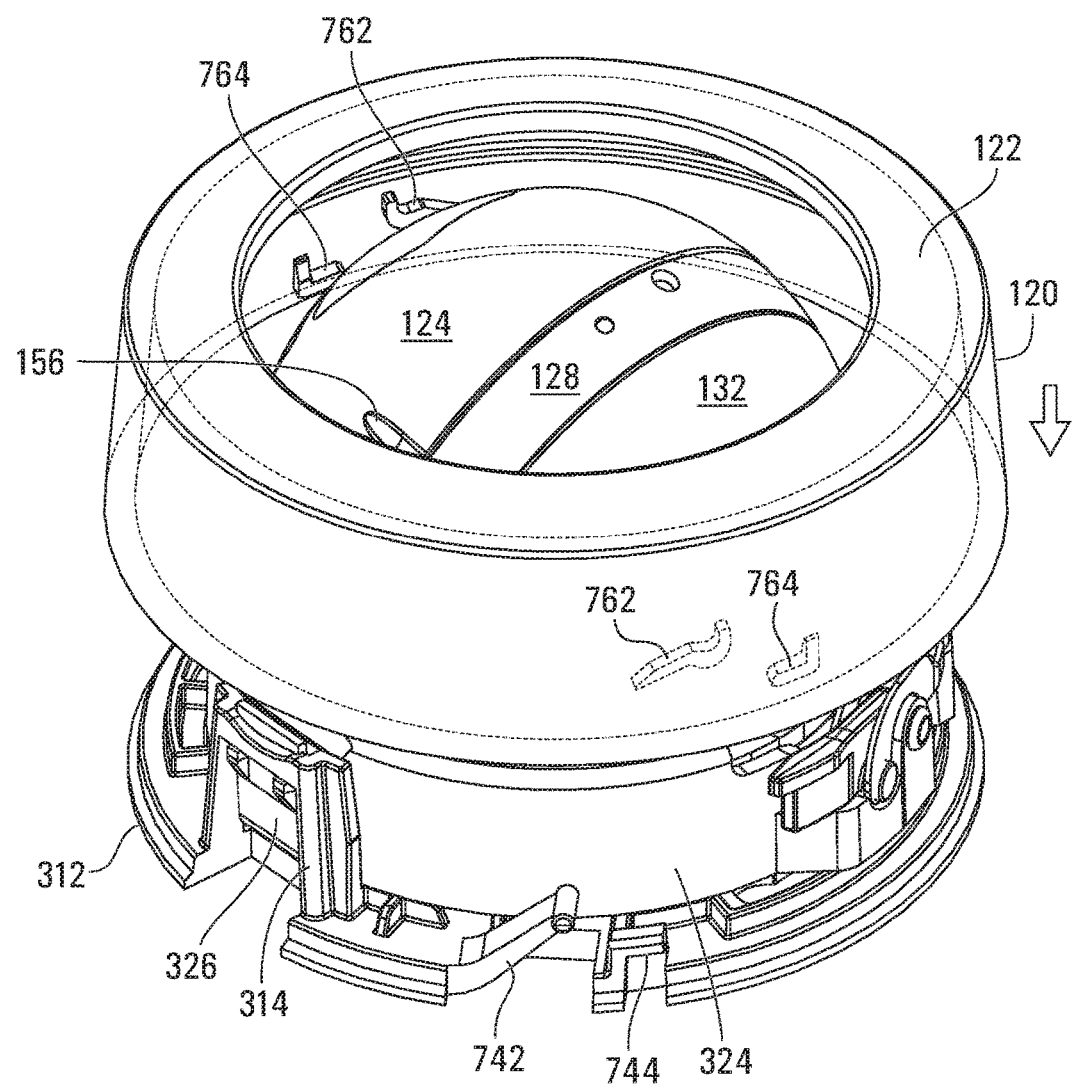
FIG. 12 illustrates a perspective view of a dome camera in accordance with at least one example embodiment, showing the bezel in a position above the spherical housing.

Reference will now be made to FIG. 12 illustrating, in accordance with an example embodiment, the dome camera 100, with the bezel 120 positioned above. The bezel 120 is suitably shaped to envelop the clamp ring 324 when appropriately positioned on the wall plate 312. The bezel 120 includes at least one pair of inward extensions: upper inward extension 762 and lower inward extension 764. The extensions 762 and 764 are sized to align with elevated members on the wall plate 312, namely upper elevated member 742 and lower elevated member 744, respectively. In the illustrated example embodiment the extensions 762 and 764 are angled towards the mounting surface.

Figure 13:
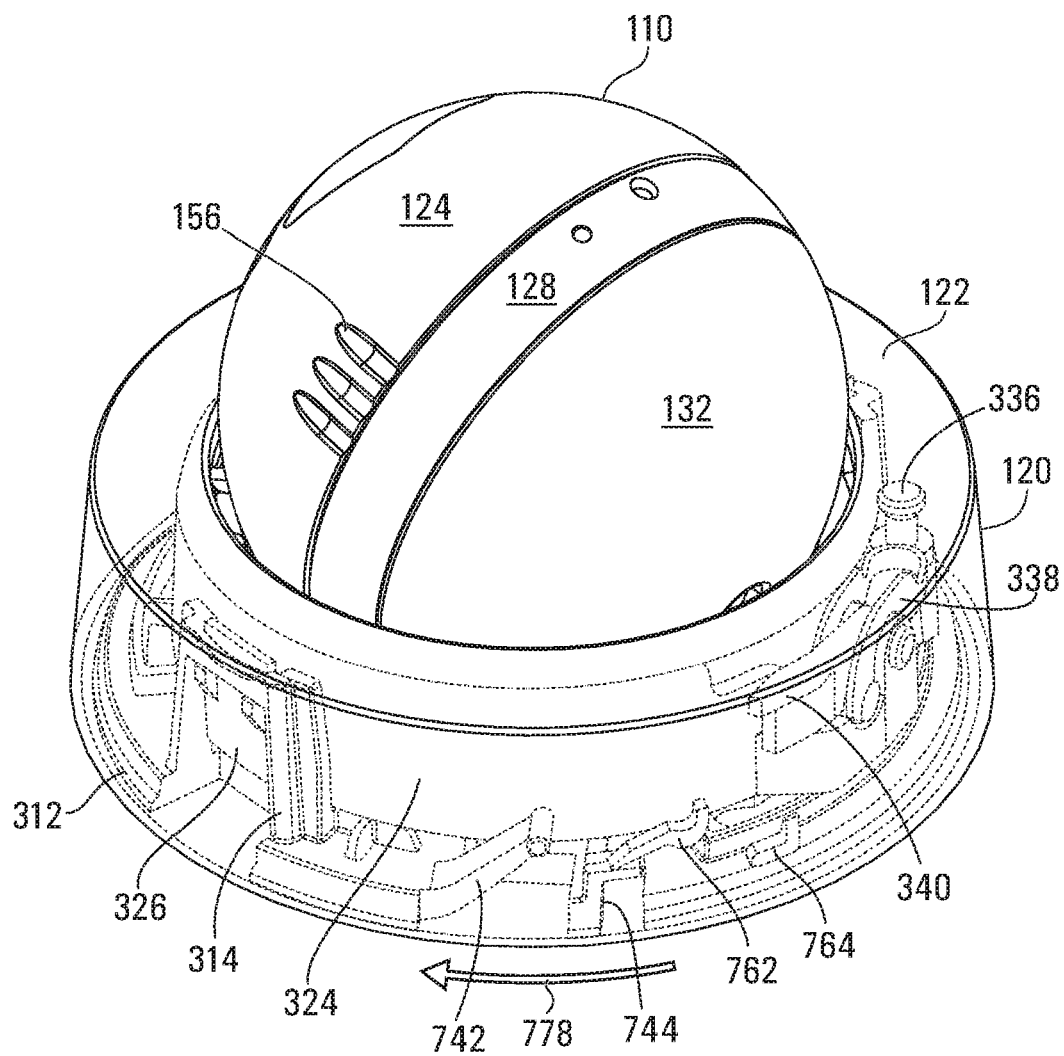
FIG. 13 illustrates a perspective view of a dome camera shown in FIG. 12, showing the bezel in place.

FIG. 13 illustrates the bezel 120 appropriately positioned around the clamp ring 324. When so positioned, the upper inward extension 762 is positioned above the lower elevated member 744, such that when rotated in direction 778, the motion of the upper inward extension 762 is not impeded until meeting the upper elevated member 742 (as shown in FIG. 14).

Figure 14:
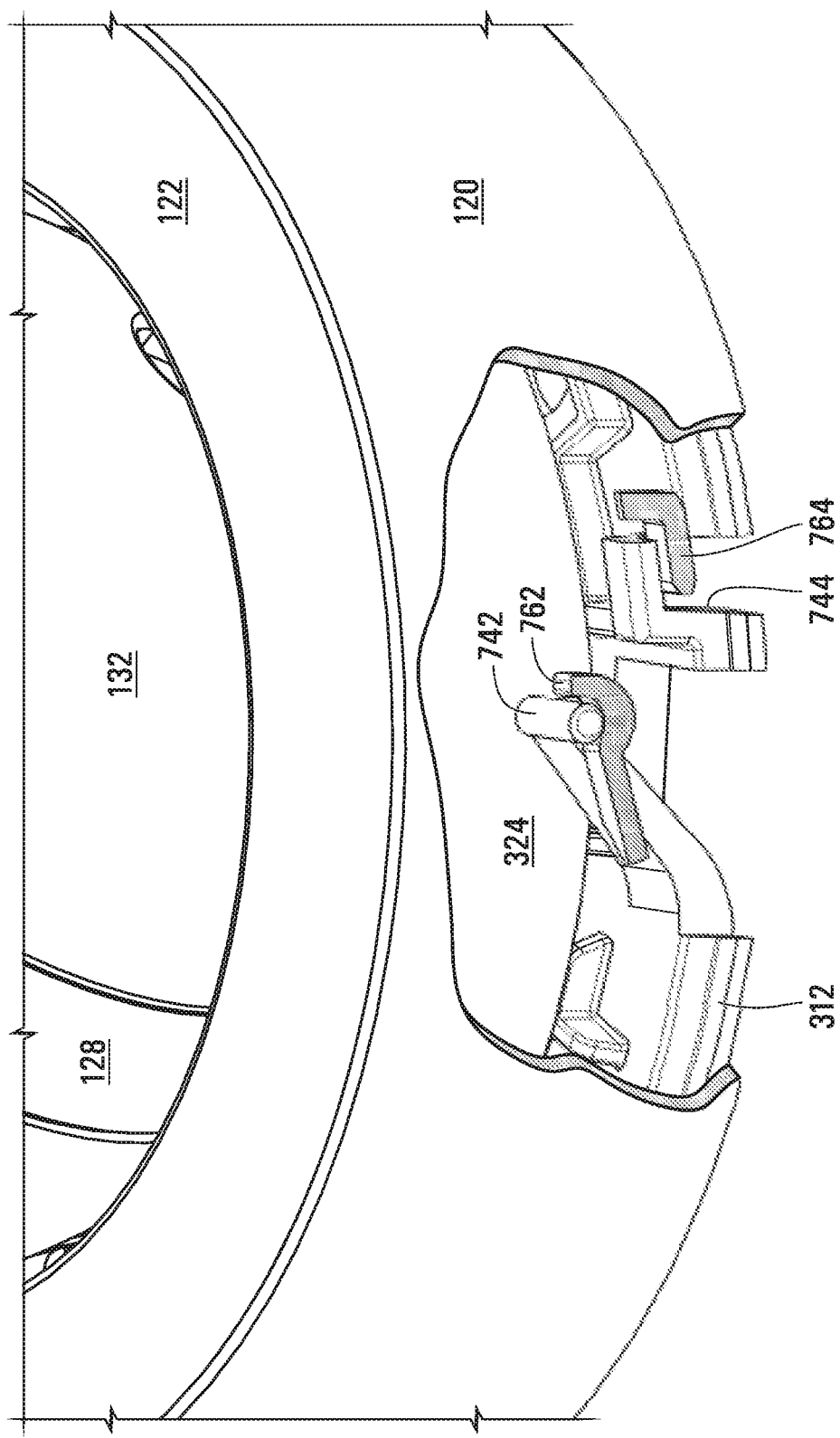
FIG. 14 illustrates a cutaway view of the dome camera shown in FIG. 13.

FIG. 14 shows a cutaway view of the bezel 120 after rotation. The upper inward extension 762 abuts the upper elevated member 742, and the lower inward extension 764 abuts the lower elevated member 744 thereby preventing further rotation in the direction 778 (FIG. 13). The bezel assembly is therefore a "twist on" system allowing the placement of bezel 120 without tools and providing an aesthetically appealing look. The angles of the upper elevated member 742 and the upper inward extension 762 can be arranged so that after being rotated, a constant upward force is applied on the bezel 120 to minimize the gap between the bezel 120 and the camera mounting surface, and to minimize play in the bezel 120 once installed.

Figure 15:
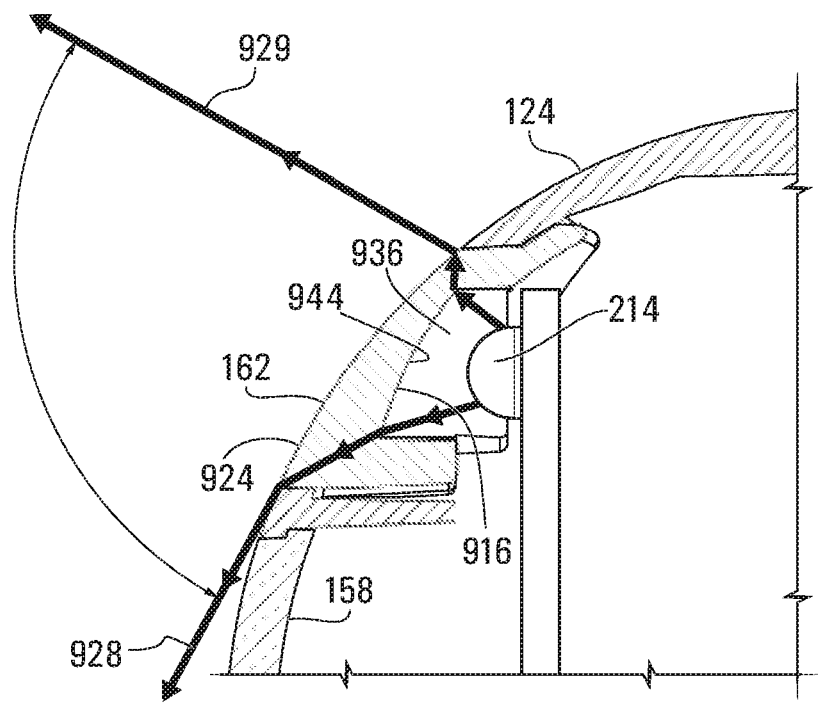
FIG. 15 illustrates a cross sectional side view of an IR emitter and IR lenslet within spherical housing in accordance with at least one example embodiment.

With reference to FIG. 15, the IR emitter 214 is positioned to have an axis off-axis to the axis of the imaging unit 210. It is typical for camera designs to be driven by concentric electronic and housing elements, and as such IR emitters are often placed in a concentric pattern surrounding an imaging unit of the same camera. The goal of an IR illumination system is to project light to a specified distance over a FOV that matches that of the imaging unit of the same camera.

As the outer surface 924 of the lenslet 162 is spherical or contains curvature at the IR emission exit point, the profile of the emitted IR is altered. The outer surface 924 is shaped to align with the surface of the spherical housing 110. In typical dome cameras the optical axis of the IR emitter is offset from the center of the sphere, so multiple IR emitters are required to fill in the shadows in the illumination created by the IR emissions and surrounding barrier. Multiple IR emitters may be costly and are less efficient due to IR absorption. An alternate solution in the market is a dome with a flat front (i.e. not completely spherical) which may work with a single IR emitter, but may be aesthetically unappealing.

According to an example embodiment, the IR illuminator 214 is off-axis to imaging unit 210, but should project to the same FOV of the imaging unit 210 (the IR emitter 214 thus may have the internal surface 916 of the lenslet 162, into which the IR emissions enter, adjusted to account for this). The exterior surface 924 is fixed by the spherical design of camera 100, or generally, by the shape of the camera device. While the industrial design can have an effect on these external shapes, as a general trend a smaller radii of curvature will scatter light, including IR emissions, wider. If the IR emissions scatter too wide some of IR emissions will result in total internal reflection which will limit the efficiency of the IR illuminator 214. Therefore, the internal surface 916 is adjusted and contoured to capture as much of the IR emissions as possible and redirect the IR emissions to match the FOV of the imaging unit 210 without occluding or trapping any IR emissions within the body of the camera 100. This allows a single IR emitter 214 to be used which reduces cost and prevents the imaging unit 210 from blocking the IR emissions from the IR emitter 214 and causing uneven and inconsistent IR illumination patterns.

Still with reference to FIG. 15, this figure illustrates, in accordance with an example embodiment, how a vertical FOV of IR emissions bounded by lines 928, 929 exit the exterior surface 924 of the lenslet 162 in accordance with example embodiments. When redirected at the inner surface 916 and again at the outer surface 924, the IR emissions are generally directed towards the position of imaging unit 210 (downwardly in the example shown) relative to the original direction to provide an IR FOV from lines 928 to 929 more closely corresponding to the FOV of the imaging unit 210.

Figure 16:
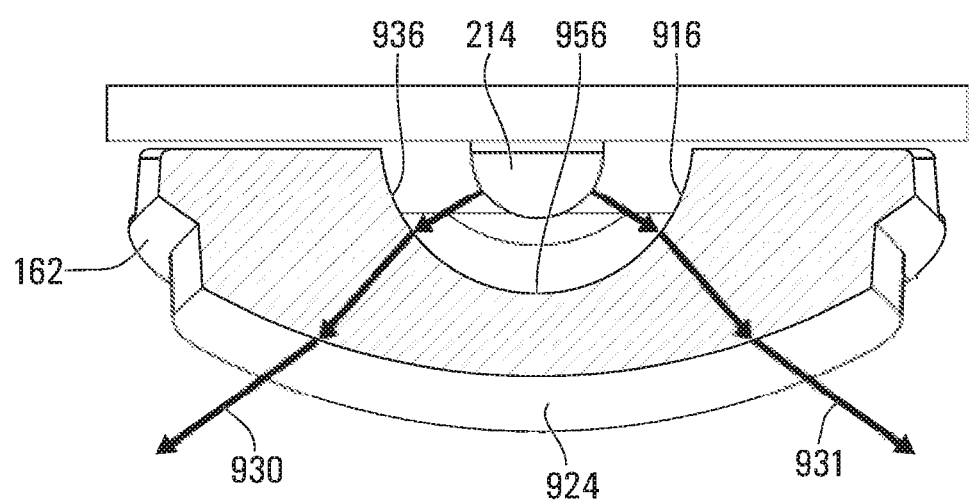
FIG. 16 illustrates a cross sectional top view of the IR emitter and IR lenslet shown in FIG. 15.

FIG. 16 illustrates, in accordance with an example embodiment, how a horizontal FOV of IR emissions bounded by lines 930, 931, exits the exterior surface 924 of the lenslet 162. The IR emissions are directed at the interior surface 916 and the exterior surface 924 to form a wider angle FOV, for example as bounded by 930 and 931, than would otherwise be the case.

Figure 17:
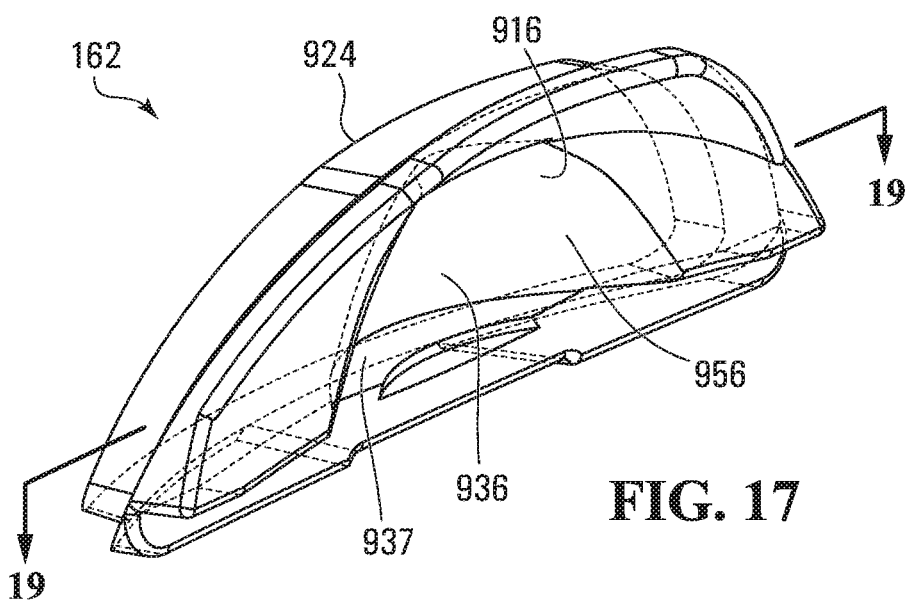
FIG. 17 illustrates a perspective view of the lenslet shown in FIG. 15.
Figure 18:
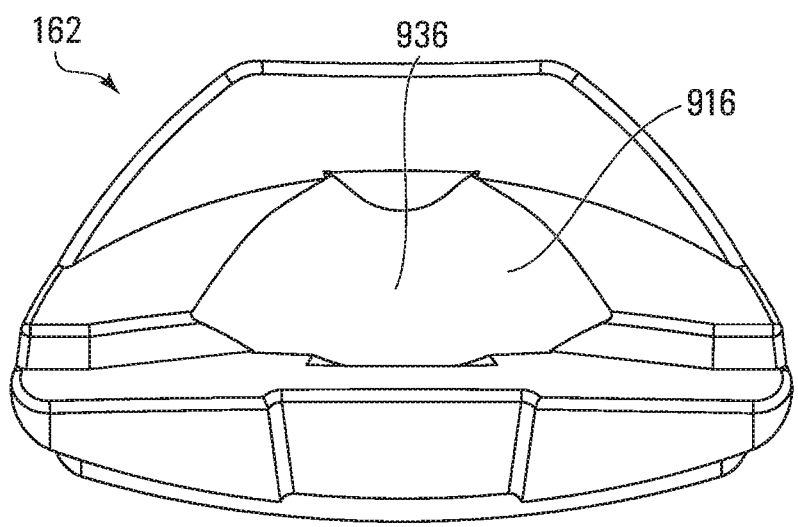
FIG. 18 illustrates a rear view of the lenslet shown in FIG. 15.
Figure 19:
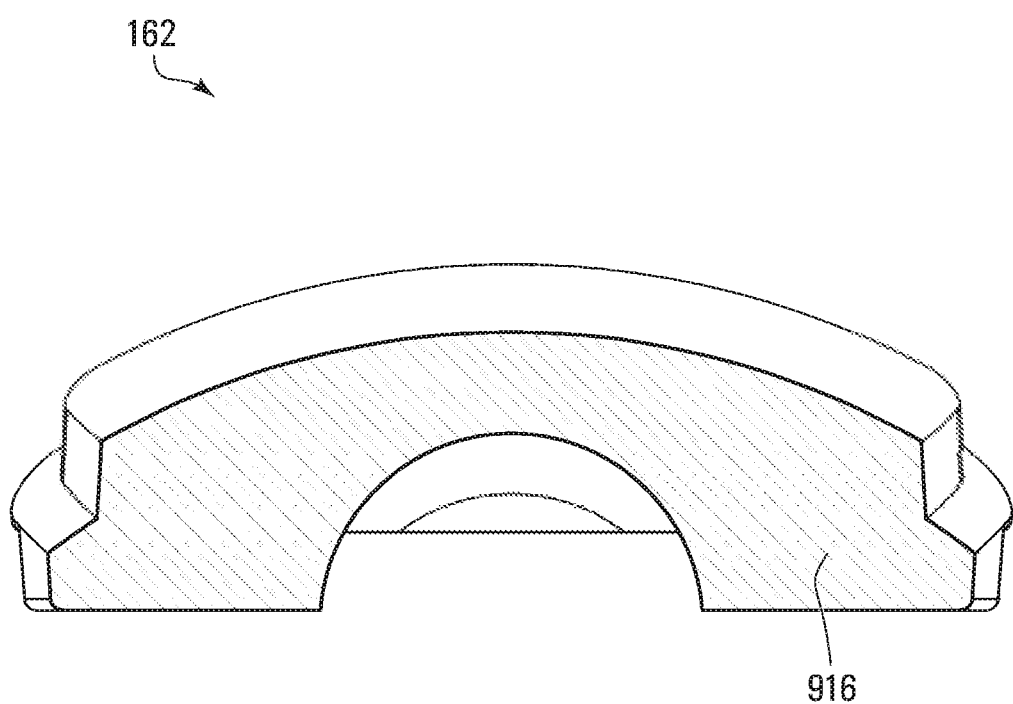
FIG. 19 illustrates a cross sectional top view of the lenslet along 19-19 in FIG. 17.

Reference will now be made to FIGS. 17-19. These figures illustrate, in accordance with example embodiments, the lenslet 162. The lenslet 162 is a conically revolved surface surrounding the IR emitter 214 and defines a recess 936 between the interior surface 916 and the IR emitter 214 which ends in a hemisphere 956. The interior surface 916 may also ends in a downward slope 944.

Figure 20:
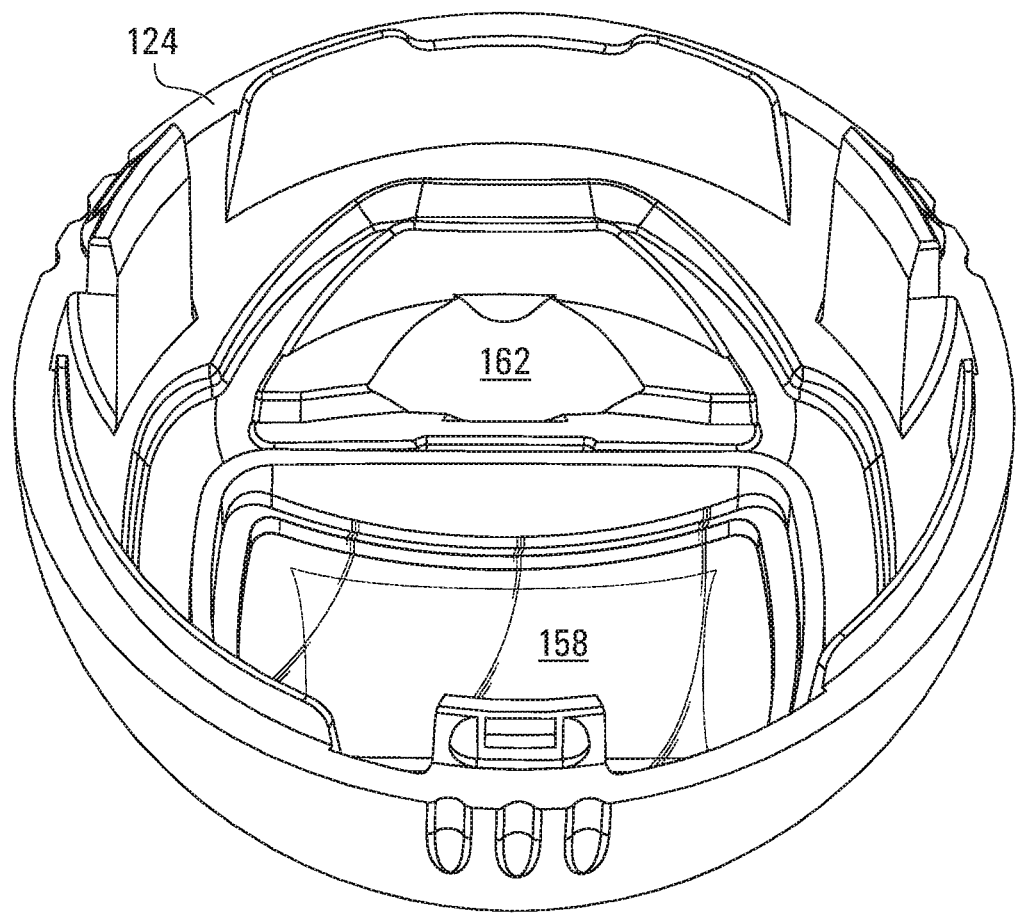
FIG. 20 illustrates an interior view of image assembly housing in accordance with at least one example embodiment.
Figure 21:
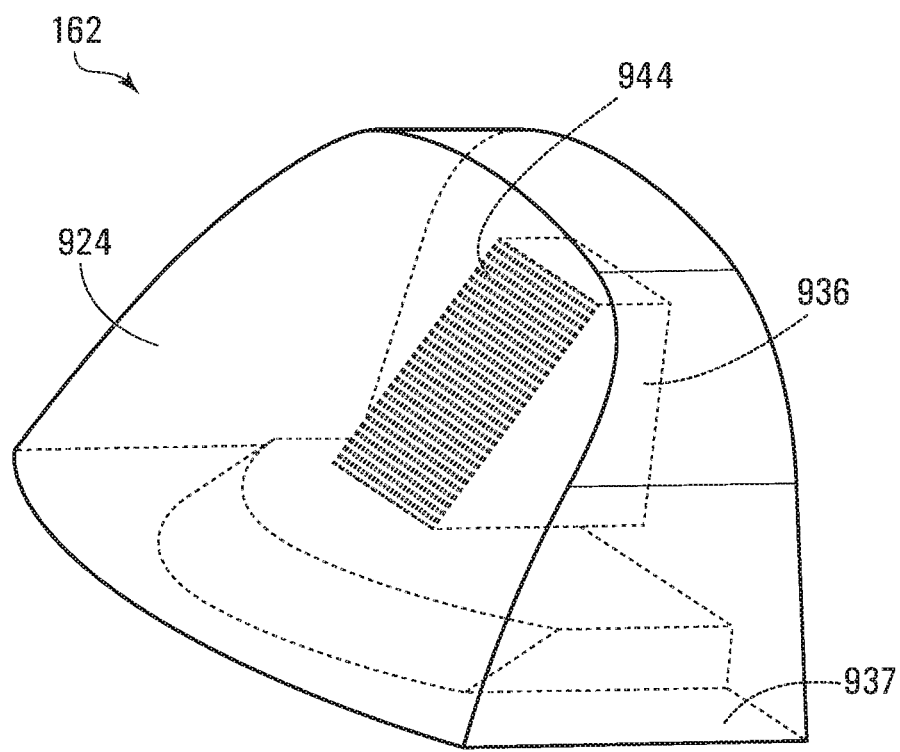
FIG. 21 illustrates a perspective view of a lenslet in accordance with at least one alternative embodiment.
Figure 22:
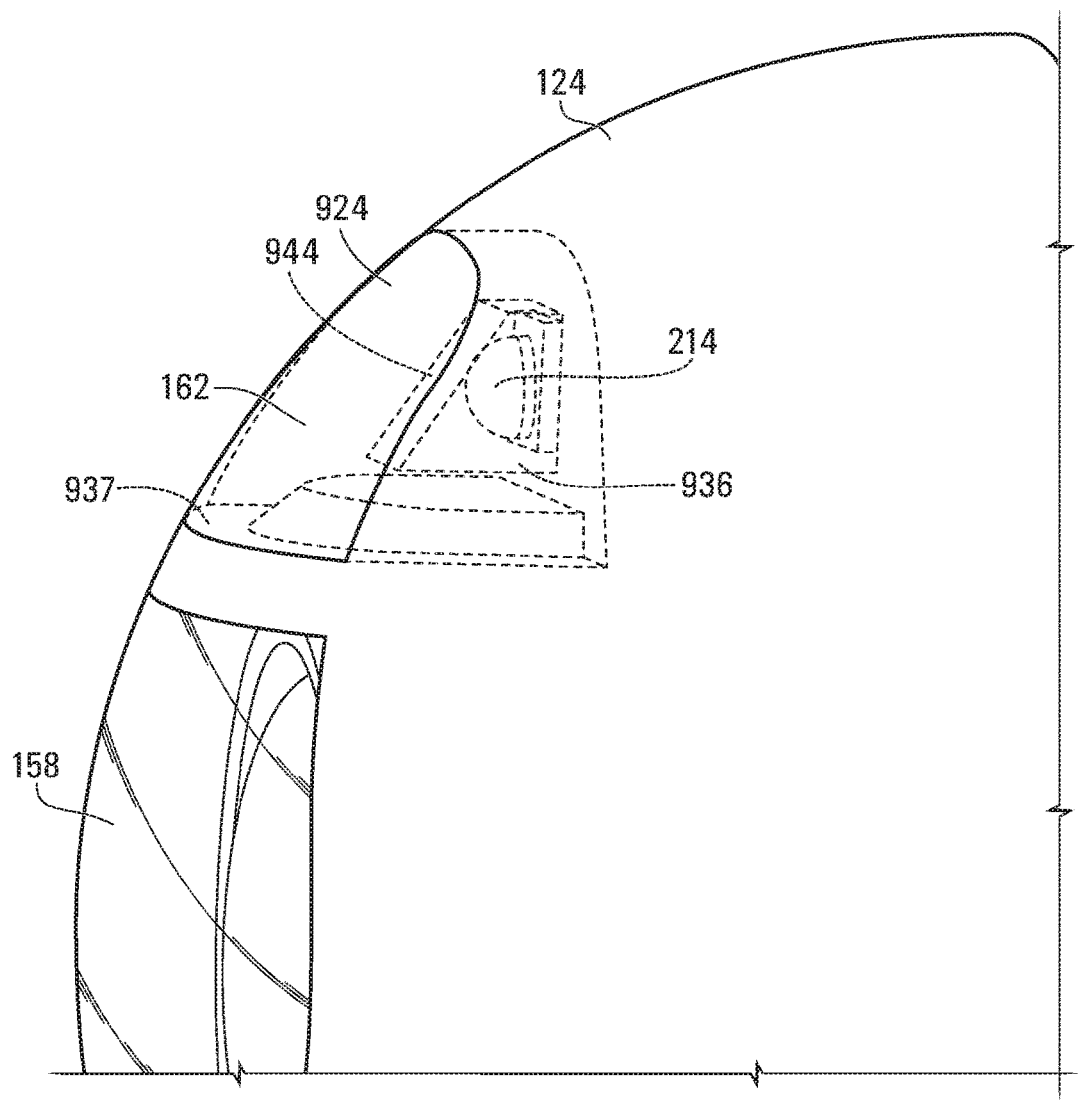
FIG. 22 illustrates a side view of the lenslet of FIG. 21 within the spherical housing.

FIG. 20 illustrates the lenslet 162 in place within the image assembly housing 124. FIG. 21 illustrates a perspective view of an alternative embodiment of the lenslet 162. A base 937 is a surface between the lenslet 162 and the imaging unit 210. The interior surface 916 may also end in a slope 944, extending outwardly in the direction of the imaging unit 210 and towards the surface of image assembly housing 124. FIG. 22 illustrates the lenslet 162 in place within the assembly housing 124, with the IR emitter 214 in position.

Figure 23:
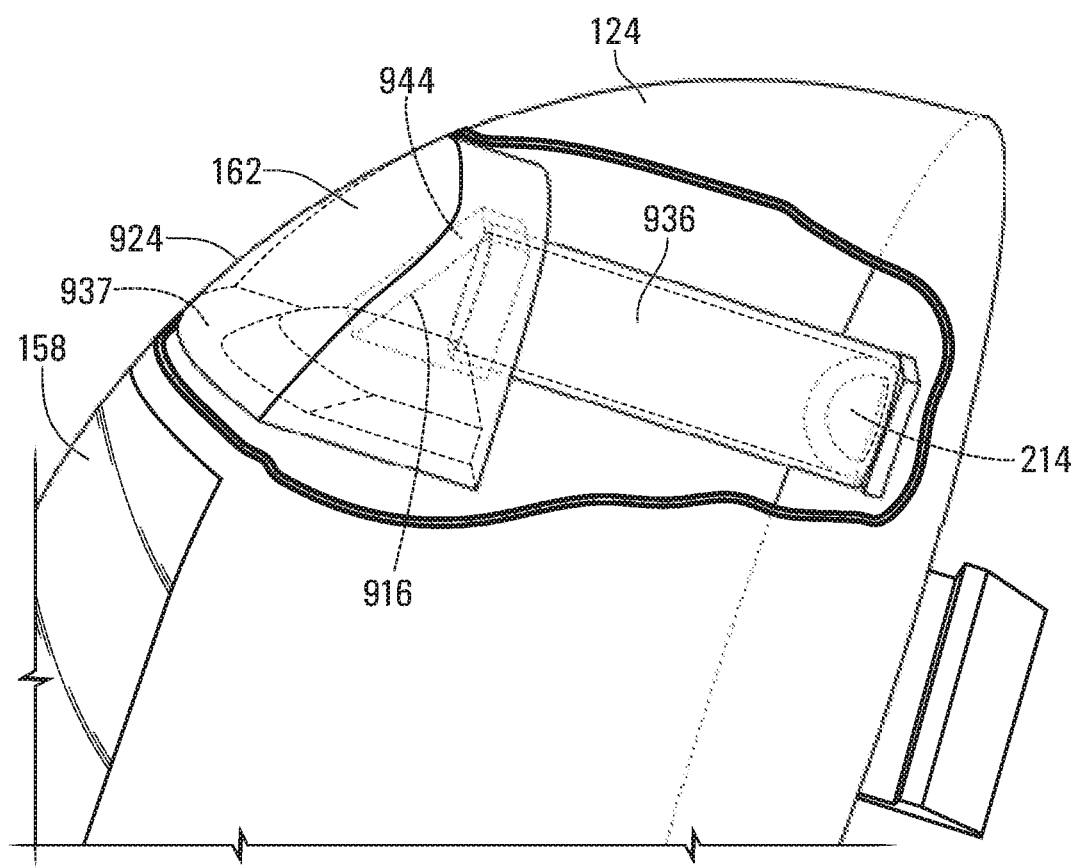
FIG. 23 illustrates a perspective view of a lenslet in accordance with at least one alternative embodiment, positioned within the spherical housing.

FIG. 23 illustrates, in accordance with an example of another alternative embodiment, the lenslet 162 wherein interior surface 916 is separated from the IR emitter 214 by an elongated recess 936.

Figure 24:
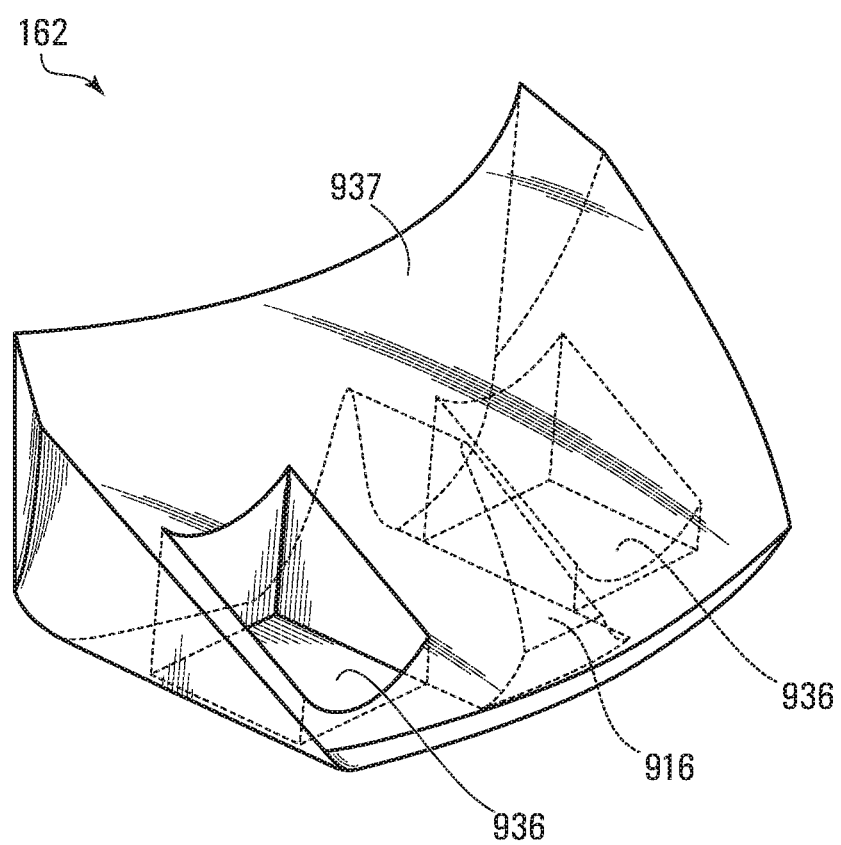
FIG. 24 illustrates a perspective view of a lenslet in accordance with at least one alternative embodiment.

FIG. 24 illustrates, in accordance with other examples of an alternative embodiment, the lenslet 162, wherein the lenslet 162 includes first and second recesses 936 for respective first and second IR emitters 214. In an alternative embodiment, different lenslets can be implemented for different purposes, for example a first lenslet could be used for long range and provide a powerful, narrow beam, and the second lenslet for short range to provide a wider beam.

In an alternative embodiment, the image assembly housing 124 may be made of a black IR-transparent material and the lenslet 162 may be molded into the image assembly housing 124. In this embodiment opaque barrier 614 is a separate piece that only surrounds the optical lens and the optical window 158 rather than being part of the structure of the image assembly housing 124.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

Therefore, the above discussed embodiments are considered to be illustrative and not restrictive, and the invention should be construed as limited only by the appended claims.

The invention claimed is:

1. A camera comprising:
   an imaging unit;
   a base that includes a track;
   a spherical housing including:
      a first housing part to contain the imaging unit; and
      a second housing part that includes a dove tail shaped to be slidably received within the track of the base; and
   a loop positionable around a periphery surface of the base, the loop being tightenable from a first position wherein the spherical housing is tiltable along the track to a second position wherein the spherical housing is locked in position.

2. The camera of claim 1 further comprising a heat sink positioned between the first part and the second part of the spherical housing.

3. The camera of claim 2 further comprising a bezel positionable over the loop.

4. The camera of claim 1 further comprising a bezel positionable over the loop.

5. The camera of claim 4 wherein the loop is a ring.

6. The camera of claim 5 further comprising a wall plate configured to allow attachment of the camera to a wall or ceiling, and
   wherein the bezel comprises an inward extension positioned and shaped to abut an outer extension on the wall plate when the bezel is rotated from a first position around the ring to a second position.

7. The camera of claim 6 wherein the ring further comprises a lever for use in tightening the ring.

8. The camera of claim 1 wherein the camera is a security camera.

9. The camera of claim 8 wherein the security camera is a dome-type security camera.

10. The camera of claim 1 wherein at least a majority portion of the periphery surface of the base is curved.

11. The camera of 5 wherein the ring further comprises a lever for use in tightening the ring.

12. The camera of claim 11 wherein the camera is a security camera.

13. The camera of claim 12 wherein the security camera is a dome-type security camera.

14. The camera of claim 11 wherein at least a majority portion of the periphery surface of the base is curved.

15. The camera of claim 2 wherein the camera is a security camera.

16. The camera of claim 15 wherein the security camera is a dome-type security camera.

17. The camera of claim 16 further comprising a bezel positionable over the loop.

18. The camera of claim 17 wherein the loop is a ring.

19. The camera of claim 18 further comprising a wall plate configured to allow attachment of the camera to a wall or ceiling, and
   wherein the bezel comprises an inward extension positioned and shaped to abut an outer extension on the wall plate when the bezel is rotated from a first position around the ring to a second position.

20. The camera of claim 19 wherein the ring further comprises a lever for use in tightening the ring.

* * * * *